US010021253B2

(12) United States Patent
Sato et al.

(10) Patent No.: US 10,021,253 B2
(45) Date of Patent: Jul. 10, 2018

(54) IMAGING APPARATUS, IMAGING SYSTEM, CONTROL METHOD FOR IMAGING APPARATUS, AND RECORDING MEDIUM STORING CONTROL PROGRAM USED FOR CONTROLLING IMAGING APPARATUS

(71) Applicant: Olympus Corporation, Hachioji-shi, Tokyo (JP)

(72) Inventors: Akinobu Sato, Hachioji (JP); Saori Matsumoto, Hino (JP); Arata Shinozaki, Hachioji (JP); Yoshihiro Yokomae, Higashiyamato (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/182,829

(22) Filed: Jun. 15, 2016

(65) Prior Publication Data

US 2016/0301814 A1    Oct. 13, 2016

Related U.S. Application Data

(63) Continuation of application No. PCT/JP2015/066732, filed on Jun. 10, 2015.

(30) Foreign Application Priority Data

Jul. 15, 2014 (JP) ................................ 2014-145322

(51) Int. Cl.
*H04N 5/225* (2006.01)
*H04N 1/00* (2006.01)
(Continued)

(52) U.S. Cl.
CPC ..... *H04N 1/00225* (2013.01); *H04N 1/00108* (2013.01); *H04N 1/00307* (2013.01);
(Continued)

(58) Field of Classification Search
None
See application file for complete search history.

(56) References Cited

U.S. PATENT DOCUMENTS

2008/0106621 A1* 5/2008 Jung ................... H04N 1/00132
348/262
2009/0142068 A1* 6/2009 Takahashi .......... H04B 10/1149
398/140
(Continued)

FOREIGN PATENT DOCUMENTS

JP    2004-179919    6/2004
JP    2009-151548    7/2009
(Continued)

OTHER PUBLICATIONS

English language translation of the International Preliminary Report on Patentability ("IPRP") to corresponding international application No. PCT/JP2015/066732, dated Jan. 26, 2016 (8 pgs.).
(Continued)

*Primary Examiner* — Stephen Coleman
(74) *Attorney, Agent, or Firm* — John C. Pokotylo; Pokotylo Patent Services

(57) ABSTRACT

An imaging apparatus includes an imaging unit, a storage, a communication unit, an image processor and a communication controller. The imaging unit generates first image data. The communication unit performs data communications between a first external apparatus and a second external apparatus. The image processor generates second image data based on the first image data. The communication controller controls communications via the communication unit. The communications includes transmission of the second image data to the first external apparatus in response to a first request. The communications includes transmission of
(Continued)

image data related to the first image data to the second external apparatus in accordance with a second request.

15 Claims, 16 Drawing Sheets

(51) Int. Cl.
 *H04N 5/232* (2006.01)
 *H04N 1/41* (2006.01)
 *H04N 5/77* (2006.01)
 *H04N 9/804* (2006.01)
(52) U.S. Cl.
 CPC ............ *H04N 1/41* (2013.01); *H04N 5/2257* (2013.01); *H04N 5/232* (2013.01); *H04N 5/77* (2013.01); *H04N 5/772* (2013.01); *H04N 9/8042* (2013.01); *H04N 2201/0039* (2013.01); *H04N 2201/0055* (2013.01); *H04N 2201/0084* (2013.01)

(56) References Cited

U.S. PATENT DOCUMENTS

| | | | | |
|---|---|---|---|---|
| 2010/0020185 | A1* | 1/2010 | Sako | H04N 7/181 348/211.1 |
| 2010/0265351 | A1* | 10/2010 | Kaibara | G06F 17/30244 348/222.1 |
| 2012/0307091 | A1* | 12/2012 | Yumiki | H04N 5/23203 348/211.4 |
| 2013/0107062 | A1 | 5/2013 | Okazaki | |
| 2015/0172538 | A1* | 6/2015 | Nordstrom | H04N 5/2252 348/207.1 |
| 2016/0025653 | A1* | 1/2016 | Jalilian | G02B 23/2476 356/241.1 |

FOREIGN PATENT DOCUMENTS

| | | |
|---|---|---|
| JP | 2012-099889 | 5/2012 |
| JP | 2013-110738 | 6/2013 |
| JP | 2014-093716 | 5/2014 |

OTHER PUBLICATIONS

International Search Report to International Patent Application No. PCT/JP2015/066732, dated Sep. 1, 2015 (3 pgs.) with translation (2 pgs.).

Written Opinion of the International Searching Authority to International Patent Application No. PCT/JP2015/066732, dated Sep. 1, 2015 (4 pgs.).

* cited by examiner

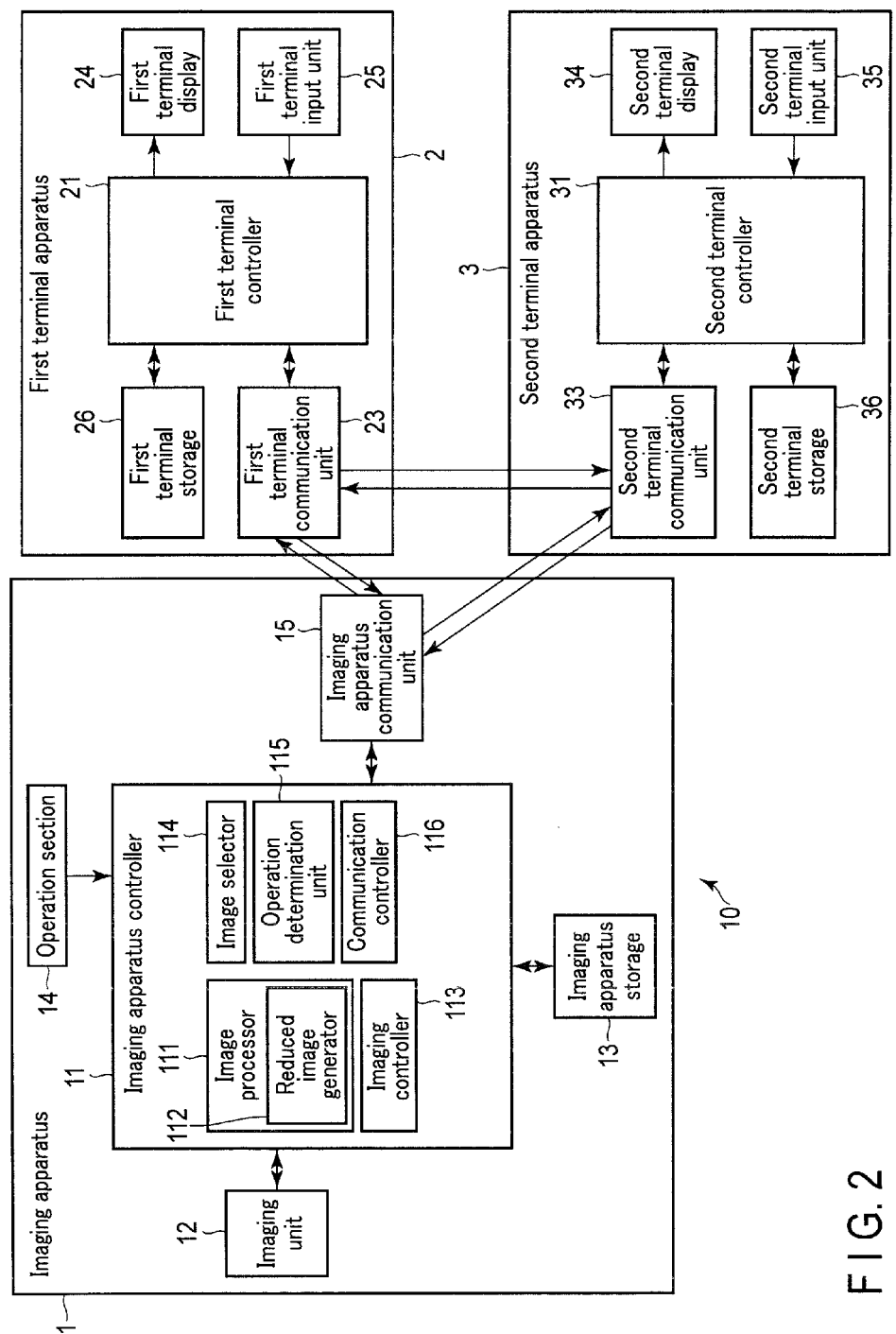
F I G. 2

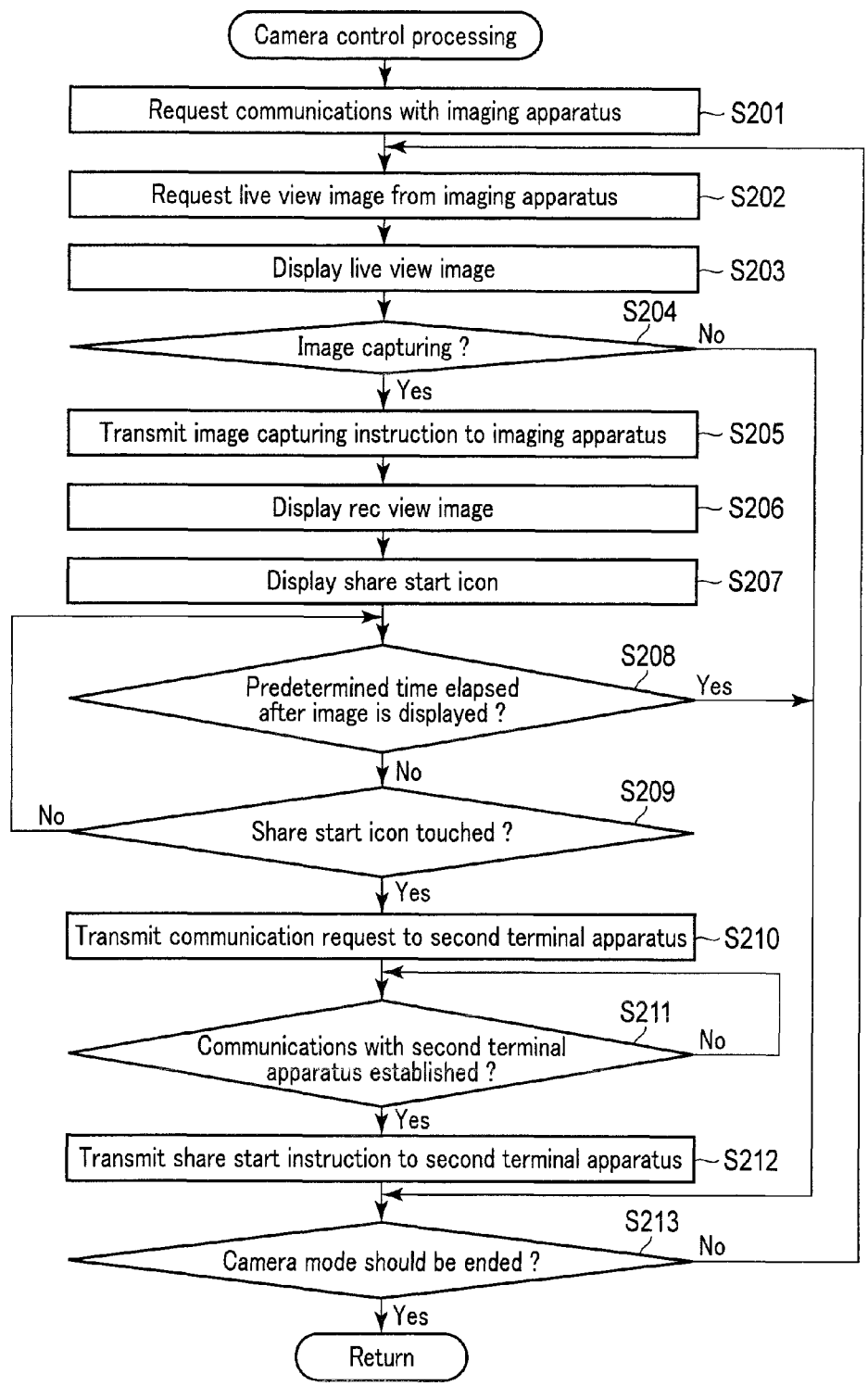
F I G. 6

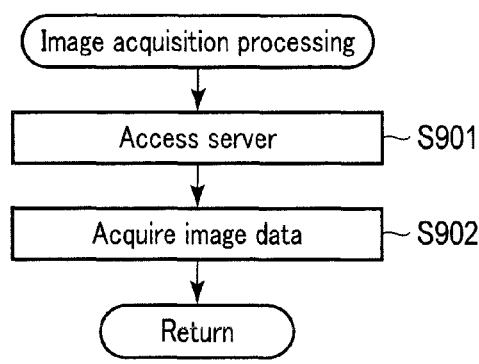
F I G. 15
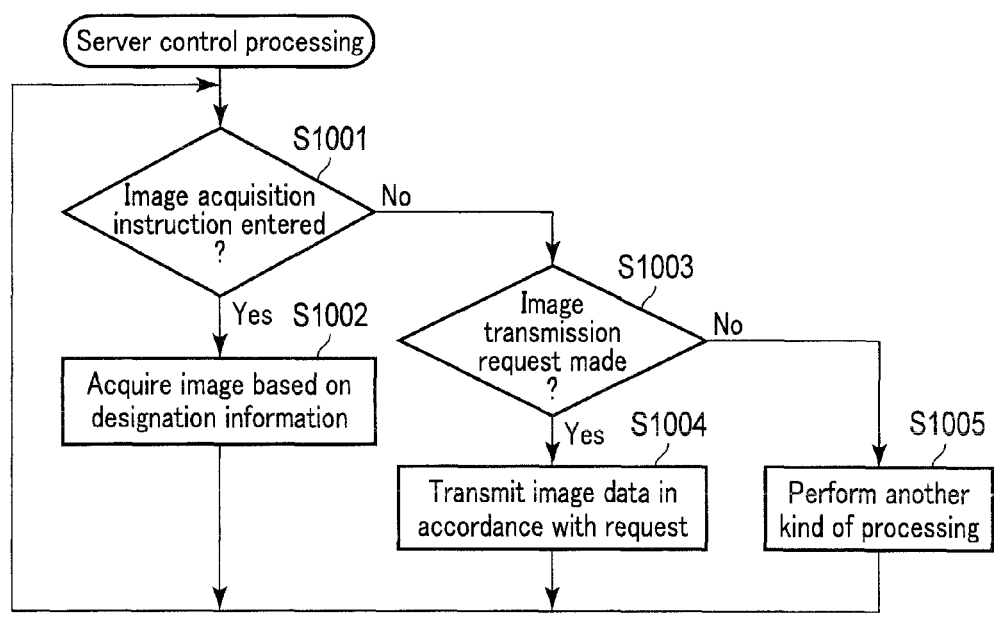
F I G. 16

IMAGING APPARATUS, IMAGING SYSTEM, CONTROL METHOD FOR IMAGING APPARATUS, AND RECORDING MEDIUM STORING CONTROL PROGRAM USED FOR CONTROLLING IMAGING APPARATUS

CROSS-REFERENCE TO RELATED APPLICATIONS

This application is a Continuation application of PCT Application No. PCT/JP2015/066732, filed Jun. 10, 2015 and based upon and claiming the benefit of priority from prior Japanese Patent Application No. 2014-145322, filed Jul. 15, 2014, the entire contents of all of which are incorporated herein by reference.

BACKGROUND OF THE INVENTION

1. Field of Invention

The present invention relates to an imaging apparatus, an imaging system, a control method for the imaging apparatus, and a recording medium storing a control program used for controlling the imaging apparatus.

2. Description of the Related Art

There may be a case where image data captured by an imaging apparatus is transmitted to another type of apparatus and used thereby. For example, Jpn. Pat. Appln. KOKAI Publication No. 2009-151548 discloses that image data is transmitted from an imaging apparatus to a printer and the printer prints an image stored in the imaging apparatus. In the system disclosed in Jpn. Pat. Appln. KOKAI Publication No. 2009-151548, the output image size at the time of printing can be easily selected by a user by operating the imaging apparatus.

When image data is transmitted or received, it is required that the communication load be reduced as much as possible since the communication traffic is restricted. This is particularly so where the communication traffic is very restricted as in wireless communications.

BRIEF SUMMARY OF THE INVENTION

According to an aspect of the invention, an imaging apparatus includes an imaging unit which generates first image data by image capturing; a storage which stores the first image data; a communication unit which performs data communications between a first external apparatus and a second external apparatus; an image processor which generates second image data based on the first image data; and a communication controller which controls communications via the communication unit, the communications including (i) transmission of the second image data to the first external apparatus in response to a first request which the first external apparatus makes as an image capturing instruction request, and (ii) transmission of image data related to the first image data to the second external apparatus in accordance with a second request, wherein the second request is based on communications between the first external apparatus and the second external apparatus and is made for permitting image data stored in the recording unit and related to the first external apparatus to be shared with the second external apparatus.

According to an aspect of the invention, an imaging system includes an imaging apparatus including an imaging unit which generates first image data by image capturing; a storage which stores the first image data; a communication unit which performs data communications between a first external apparatus and a second external apparatus; an image processor which generates second image data based on the first image data; and a communication controller which controls communications via the communication unit, the communication including (i) transmission of the second image data to the first external apparatus in response to a first request, wherein the first request is made by the first external apparatus as an image capturing instruction request, and (ii) transmission of image data related to the first image data to the second external apparatus in accordance with a second request, wherein the second request is based on communications between the first external apparatus and the second external apparatus and is made for permitting image data stored in the storage and related to the first external apparatus to be shared with the second external apparatus; the first external apparatus which receives the second image data from the imaging apparatus by requesting the imaging apparatus to provide the second image data by the first request, and which transmits information on the image data related to the first image data to the second external apparatus; and the second external apparatus which makes the second request based on the information on the image data related to the first image data received from the first external apparatus and which receives the image data related to the first image data from the imaging apparatus.

According to an aspect of the invention, a control method for an imaging apparatus includes generating first image data by image capturing; storing the first image data; generating second image data based on the first image data; transmitting the second image data to a first external apparatus in accordance with a first request, wherein the first request is made by the first external apparatus as an image capturing request; and transmitting image data related to the first image data to a second external apparatus in accordance with a second request, wherein the second request is based on communications between the first external apparatus and the second external apparatus and is made for permitting image data stored in a storage and related to the first external apparatus to be shared with the second external apparatus.

According to an aspect of the invention, a non-transitory computer-readable recording medium stores a control program that causes a computer to generate first image data by image capturing; store the first image data; generate second image data based on the first image data; transmit the second image data to a first external apparatus in accordance with a first request, wherein the first request is made by the first external apparatus as an image capturing request; and transmit image data related to the first image data to a second external apparatus in accordance with a second request, wherein the second request is based on communications between the first external apparatus and the second external apparatus and is made for permitting image data stored in a storage and related to the first external apparatus to be shared with the second external apparatus.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram schematically showing an exemplary configuration of the imaging system of the first embodiment.

FIG. 6 is a flowchart illustrating an example of camera control processing according to the first embodiment.

FIG. 15 is a flowchart illustrating an example of image acquisition processing according to the second embodiment.

FIG. 16 is a flowchart illustrating an example of server control processing according to the second embodiment.

DETAILED DESCRIPTION OF THE INVENTION

First Embodiment

Figure 1A:
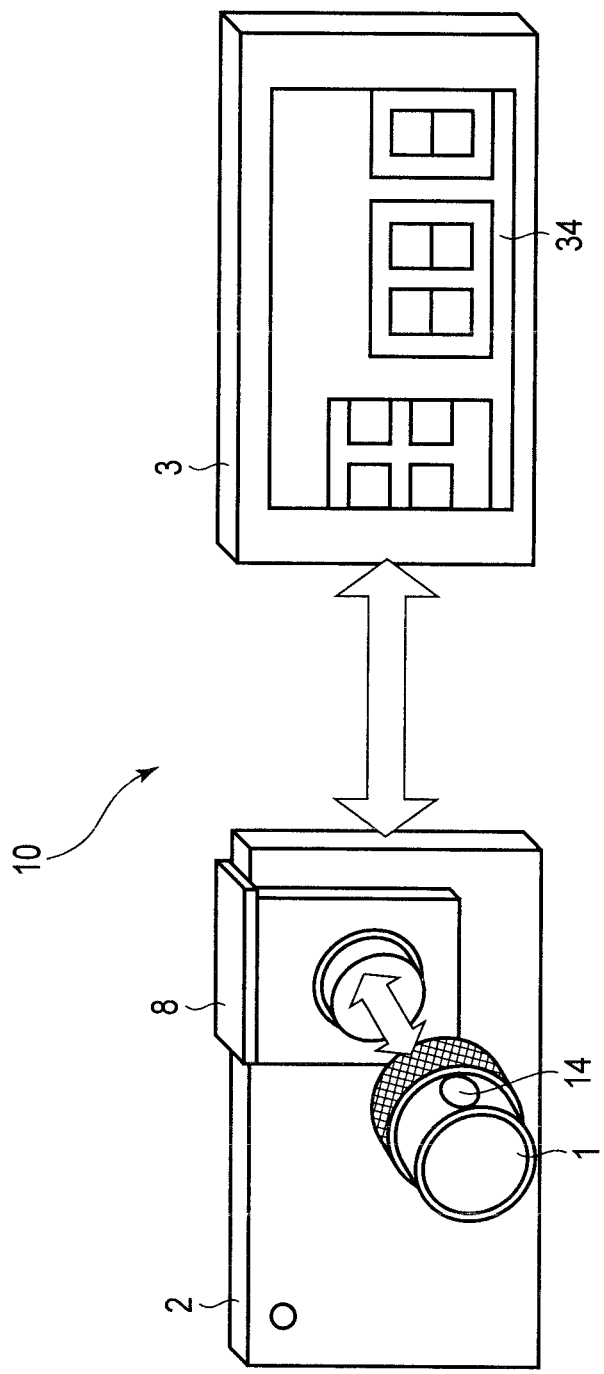
FIG. 1A schematically illustrates the outward appearance of an example of an imaging system according to the first embodiment.

A description will now be given of the first embodiment with reference to the accompanying drawings. FIG. 1A schematically illustrates the outward appearance of an imaging system 10 according to the first embodiment. As shown in FIG. 1A, the imaging system 10 comprises an imaging apparatus 1, a first terminal apparatus 2 and a second terminal apparatus 3.

According to the first embodiment, the imaging apparatus 1 is a lens-type camera including an optical system (such as a lens), an imaging element, an image processing apparatus, etc., but not including a display or a release switch. The imaging apparatus 1 is not limited to the lens-type camera and may be a lens-interchangeable camera or a lens-fixed camera. In addition, the imaging apparatus 1 is not limited to a camera for a consumer; it may be a monitor camera, a camera for a microscope, or a camera for an industrial apparatus (such as an inspection camera). The imaging apparatus 1 may be an observation apparatus used for various medical purposes. The technology of the present embodiment is applicable to these types of camera.

The imaging apparatus 1 is provided with a minimal operation section 14, such as a power switch. If the imaging apparatus 1 is driven on an AC power supply or generates electricity from solar light, the imaging apparatus 1 does not have to comprise the power switch. The first terminal apparatus 2 is a portable information terminal, such as a smartphone or a tablet PC. The first terminal apparatus 2 may be a wearable terminal. According to the present embodiment, the imaging apparatus 1 is coupled to the first terminal apparatus 2 by means of an attachment 8. When combined, the imaging apparatus 1 and the first terminal apparatus 2 jointly function as a single camera. The imaging apparatus 1 and the first terminal apparatus 2 communicate with each other, using a wireless communication method such as a wireless LAN. The first terminal apparatus 2 functions as a display and an operation section of the imaging apparatus 1.

Figure 1B:
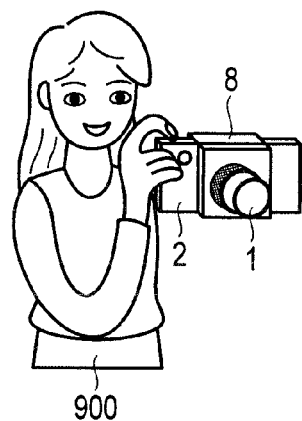
FIG. 1B schematically illustrates how a user operates a camera made up of an imaging apparatus and a first terminal apparatus.

FIG. 1B schematically illustrates how a user operates the camera made up of the imaging apparatus 1 and the first terminal apparatus 2. As shown in FIG. 1B, the user 900 can operate the camera made up of the imaging apparatus 1 and the first terminal apparatus 2 in the same way as in the case of a general type of camera.

Like the first terminal apparatus 2, the second terminal apparatus 3 is an information terminal such as a smartphone or a tablet terminal. The second terminal apparatus 3 includes a second terminal display 34. The second terminal apparatus 3 communicates with the imaging apparatus 1 and the first terminal apparatus 2, and an image captured by the imaging apparatus 1 is displayed on the second terminal display 34. In other words, the second terminal apparatus 3 shares the images captured by the imaging apparatus 1 and the first terminal apparatus 2, with the imaging apparatus 1 and the first terminal apparatus 2. Like the first terminal apparatus 2, the second terminal apparatus 3 may be a smartphone, a tablet terminal or a wearable terminal.

Figure 1C:
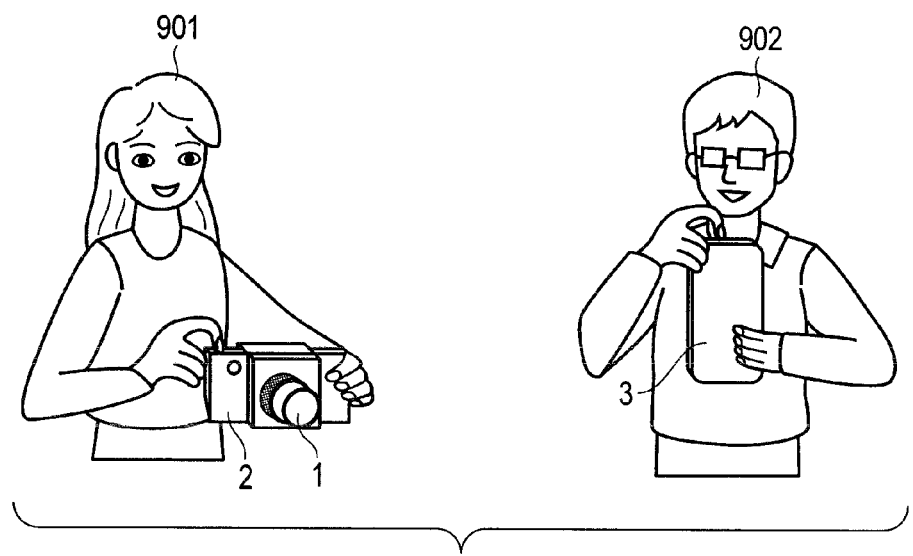
FIG. 1C schematically illustrates how a first user operates the imaging apparatus and the first terminal apparatus and how a second user operates a second terminal apparatus.

FIG. 1C schematically illustrates how a first user 901 operates the imaging apparatus 1 and the first terminal apparatus 2 and how a second user 902 operates the second terminal apparatus 3. The first user 901 operates the first terminal apparatus 2 to select an image to be shared with the second terminal apparatus 3, and transmits information on that image to the second terminal apparatus 3 operated by the second user 902. Based on the information received from the first terminal apparatus 2 and pertaining to the image to be shared, the second terminal apparatus 3 operated by the second user 902 acquires the image from the imaging apparatus 1.

FIG. 2 schematically illustrates an exemplary configuration of the imaging system 10. The imaging apparatus 1 comprises an imaging apparatus controller 11, an imaging unit 12, an imaging apparatus storage 13, an operation section 14 and an imaging apparatus communication unit 15.

The imaging apparatus controller 11 incorporates a central processing unit (CPU), an application specific integrated circuit (ASIC) or the like, and performs various kinds of operation. The imaging apparatus controller 11 controls each of the portions of the imaging apparatus 1 and performs various kinds of image processing. The operation of the imaging apparatus controller 11 is executed in accordance with a program stored in the imaging apparatus 1.

The imaging unit 12 comprises an optical system (including a lens and a diaphragm) and an imaging element. In the imaging unit 12, the optical system forms an object image on the imaging surface of the imaging element, and the imaging element generates image data on the basis of the object image. The imaging unit 12 transmits the generated image data to the imaging apparatus controller 11. The image data is subjected to image processing by the imaging apparatus controller 11.

The imaging apparatus storage 13 is a general type of recording medium. The imaging apparatus storage 13 may be fixed to the imaging apparatus 1; alternatively, it may be detachably attached to the imaging apparatus 1. The imaging apparatus storage 13 stores the image data processed by the imaging apparatus controller 11.

The operation section 14 is a switch or the like provided for the imaging apparatus 1. The operation section 14 receives instructions from the user and supplies them to the imaging apparatus controller 11 as operation signals. The operation section 14 includes a power supply switch, for example.

Under the control of the imaging apparatus controller 11, the imaging apparatus communication unit 15 performs communications with an external apparatus. Although the imaging apparatus communication unit 15 is depicted as one structural element in FIG. 2, it may be made up of two or more devices. To be more specific, the imaging apparatus communication unit 15 may include devices properly selected from the following: a device for performing communications using Wi-Fi, a device for performing communications using Bluetooth, a device for performing communications using Near Field Communication (NFC), a device for performing communications using Transfer Jet, etc.

A more detailed description will be given of the imaging apparatus controller 11. The imaging apparatus controller 11 comprises an image processor 111, an imaging controller 113, an image selector 114, an operation determination unit 115 and a communication controller 116. The image processor 111 performs various kinds of image processing. For example, the image processor 111 generates an image to be transmitted to the first terminal apparatus 2 and the second terminal apparatus 3, based on the captured image. The image processor 111 includes a reduced image generator 112. The reduced image generator 112 reduces the image size of image data. In addition, the reduced image generator 112 trims an image.

The imaging controller 113 controls the imaging operation performed by the imaging unit 12. The image selector 114 reads predetermined image data from the imaging apparatus storage 13 in accordance with a request made by an external terminal apparatus. The operation determination unit 115 determines what operation is entered at the operation section 14. In addition, the operation determination unit 115 determines what operation is instructed by the first terminal apparatus 2 and acquired by way of the imaging apparatus communication unit 15. The communication controller 116 controls the communications which are performed between the imaging apparatus 1 and the first terminal apparatus 2 or second terminal apparatus 3 by way of the imaging apparatus communication unit 15.

As shown in FIG. 2, the first terminal apparatus 2 includes a first terminal controller 21, a first terminal communication unit 23, a first terminal display 24, a first terminal input unit 25 and a first terminal storage 26.

The first terminal controller 21 includes, for example, a CPU and an ASIC, and controls the operation of each portion of the first terminal apparatus 2. The operation of the first terminal controller 21 is executed in accordance with a program stored in the first terminal apparatus 2.

Under the control of the first terminal controller 21, the first terminal communication unit 23 performs communications with an external apparatus. For example, the first terminal apparatus 2 performs communications with the imaging apparatus 1 by way of the first terminal communication unit 23 and the imaging apparatus communication unit 15. To be more specific, control signals for controlling the operation of the imaging apparatus 1 are transmitted from the first terminal apparatus 2 to the imaging apparatus 1. The first terminal apparatus 2 receives image data from the imaging apparatus 1 by way of the first terminal communication unit 23 and the imaging apparatus communication unit 15. The first terminal apparatus 2 performs communications with the second terminal apparatus 3 by way of the first terminal communication unit 23 and a second terminal communication unit 33 mentioned later. The first terminal communication unit 23 includes devices for performing communications using Wi-Fi, Bluetooth, NFC, Transfer Jet, etc., so that the first terminal communication unit 23 can operate with the imaging apparatus communication unit 15 and the second terminal communication unit 33 of the second terminal apparatus 3.

The first terminal display 24 includes, for example, a liquid crystal display. The first terminal display 24 displays various images under the control of the first terminal controller 21. The first terminal input unit 25 includes a touch panel, for example. The first terminal input unit 25 is provided on the first terminal display 24. The first terminal input unit 25 detects, for example, a touched position and supplies the detected position information to the first terminal controller 21. The first terminal input unit 25 is not limited to the touch panel. The first terminal input unit 25 may be a keyboard, a device which detects a gesture as a user's intention, a device which utilizes a biological signal, etc. That is, input devices of various types are applicable to the first terminal input unit 25.

The first terminal storage 26 includes a general type of storage. The first terminal storage 26 stores, for example, image data acquired from the imaging apparatus 1.

As shown in FIG. 2, the second terminal apparatus 3 includes a second terminal controller 31, a second terminal communication unit 33, a second terminal display 34, a second terminal input unit 35 and a second terminal storage 36. The second terminal apparatus 3 has a similar configuration to that of the first terminal apparatus 2 and functions in a similar manner. To be specific, the second terminal controller 31 corresponds to the first terminal controller 21, the second terminal communication unit 33 corresponds to the first terminal communication unit 23, the second terminal display 34 corresponds to the first terminal display 24, the second terminal input unit 35 corresponds to the first terminal input unit 25, and the second terminal storage 36 corresponds to the first terminal storage 26.

The second terminal apparatus 3 communicates with the first terminal apparatus 2 by way of the second terminal communication unit 33 and the first terminal communication unit 23. For example, the second terminal apparatus 3 exchanges information on shared images with the first terminal apparatus 2. The second terminal apparatus 3 communicates with the imaging apparatus 1 by way of the second terminal communication unit 33 and the imaging apparatus communication unit 15. For example, the second terminal apparatus 3 acquires image data from the imaging apparatus 1. The second terminal communication unit 33 includes devices for performing communications using Wi-Fi, Bluetooth, NFC, Transfer Jet, etc., so that the second terminal communication unit 33 can operate with the imaging apparatus communication unit 15 and the first terminal communication unit 23 of the first terminal apparatus 2. The second terminal display 34 display images based on the image data acquired from the imaging apparatus 1.

A description will now be given of an example of an operation performed by the imaging system of the first embodiment. First, the outline of the operation of the imaging system will be described with reference to FIGS. 3 and 4. In the present embodiment, wireless communications are performed using Wi-Fi, and the communications with the imaging apparatus 1 are performed in the infrastructure mode, which enables communications between a plurality of apparatuses. In the present embodiment, the imaging apparatus 1 functions as an access point.

Figure 3:
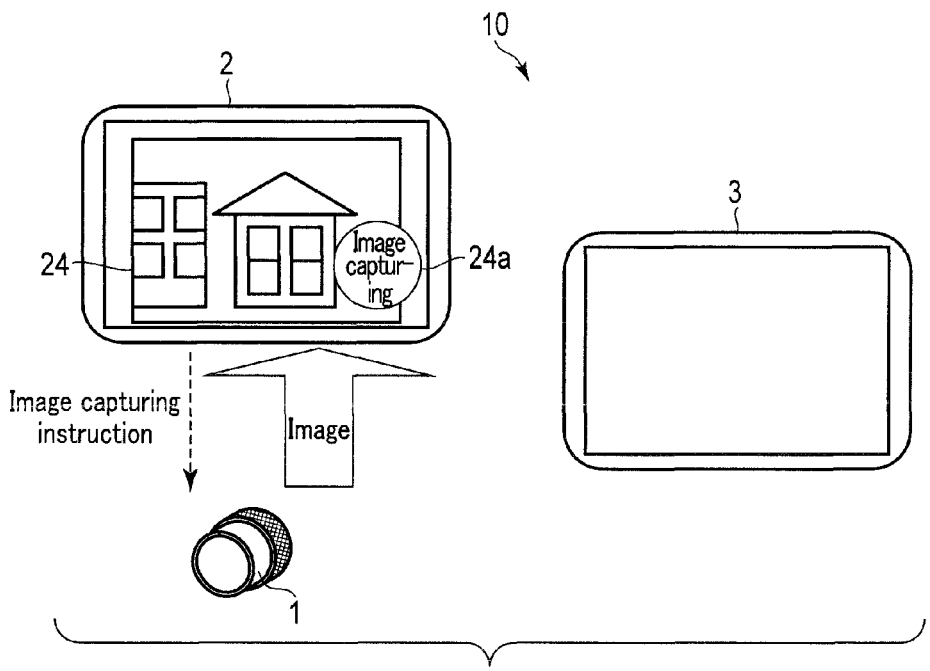
FIG. 3 schematically illustrates how the imaging apparatus performs an image capturing operation under the control of the first terminal apparatus.

FIG. 3 schematically illustrates how the imaging apparatus 1 performs an image capturing operation under the control of the first terminal apparatus 2. The imaging apparatus 1 captures an image of an object and generates live view image data. The imaging apparatus 1 transmits the generated live view image data to the first terminal apparatus 2. Upon reception of the live view image data, the first terminal apparatus 2 displays a live view image on the first terminal display 24. The live view image is used for confirmation and should be displayed in real time. Therefore, the processing for reducing the communication volume of image data, such as resizing, trimming and compression, may be performed. Since the communications between the first terminal apparatus 2 and the imaging apparatus 1 include transmission and reception of an image whose data size is comparatively large, they should preferably be performed using comparatively fast communication means, such as Wi-Fi.

An image capturing icon 24a is displayed on the first terminal display 24. When this image capturing icon 24a is touched, the touch is sensed by the first terminal input unit 25. An image capturing instruction is supplied from the first terminal apparatus 2 to the imaging apparatus 1. Upon reception of the image capturing instruction, the imaging apparatus 1 captures a still image. The imaging apparatus 1 records the data on the captured still image in the imaging apparatus storage 13. In addition, the imaging apparatus 1 transmits properly reduced still image data to the first terminal apparatus 2. Based on the received data, the first terminal apparatus 2 displays the image on the first terminal display 24 as a rec view image (i.e., an image used for checking or confirmation). If the first terminal apparatus 2 does not display a live view image or a rec view image and simply transmits an image capturing instruction to the imaging apparatus 1, then the communications between the first terminal apparatus 2 and the imaging apparatus 1 may be performed using a communication means that is comparatively slow but enables comparatively easy connection, such as Bluetooth.

Figure 4:
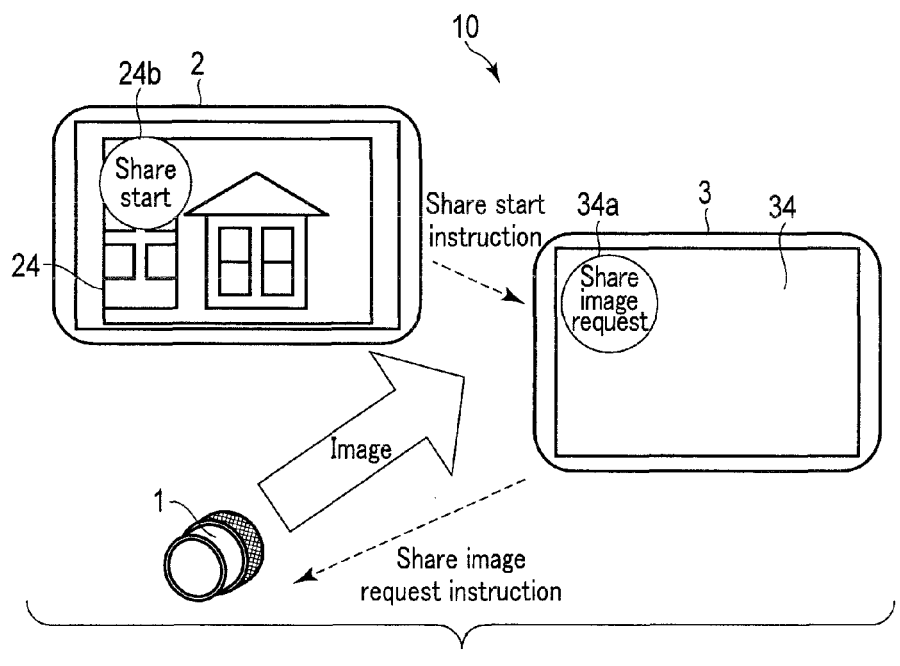
FIG. 4 schematically illustrates a state immediately after a still image is captured.

FIG. 4 schematically illustrates a state immediately after a still image is captured. A share start icon 24b is displayed on the first terminal display 24 together with a rec view image. When the first user touches the share start icon 24b, the first terminal apparatus 2 transmits a share start instruction to the second terminal apparatus 3. The share start instruction includes information required for acquiring a still image captured by the imaging apparatus 1 and the first terminal apparatus 2. The information includes, for example, information on the storage position where the still image data is stored, the file name of the still image data, connection information required for establishing the communications between the imaging apparatus 1 and the second terminal apparatus 3, etc. Since these pieces of information are comparatively small in data size, the communications between the first terminal apparatus 2 and the second terminal apparatus 3 may be performed using a comparatively slow communication means, such as Bluetooth. If the first terminal apparatus 2 and the second terminal apparatus 3 are located close to each other and those pieces of information are transmitted and received, a communication means such as NFC or Transfer Jet may be used. Needless to say, Wi-Fi or another suitable communication means may be used. If the communication means that is comparatively low in secrecy but has a wide wave emission range is used (for example, Bluetooth is used), measures should be preferably taken for information security, including authentication, encryption, etc.

Upon reception of the share start instruction, the second terminal apparatus 3 displays a share image request icon 34a on the second terminal display 34. When the second user touches the share image request icon 34a, the second terminal apparatus 3 transmits a share image request instruction to the imaging apparatus 1. This share image request instruction includes information included in the share image start instruction and indicative of a still image, such as the file name of the still image. Upon reception of the share image request instruction, the imaging apparatus 1 transmits the image data on the still image to the second terminal apparatus 3. As a result, the second terminal apparatus 3 acquires image data on the still image. The second terminal apparatus 3 displays the acquired image on the second terminal display 34. In this manner, the image data on a still image is shared by the first terminal apparatus 2 and the second terminal apparatus 3. Since the communications between the imaging apparatus 1 and the second terminal apparatus 3 include transmission and reception of an image whose data size is comparatively large, they should preferably be performed using comparatively fast communication means, such as Wi-Fi. Needless to say, communication means that does not provide fast communications may be used, but it may take a comparatively long time before the second terminal apparatus 3 acquires image data from the imaging apparatus 1.

Figure 5:
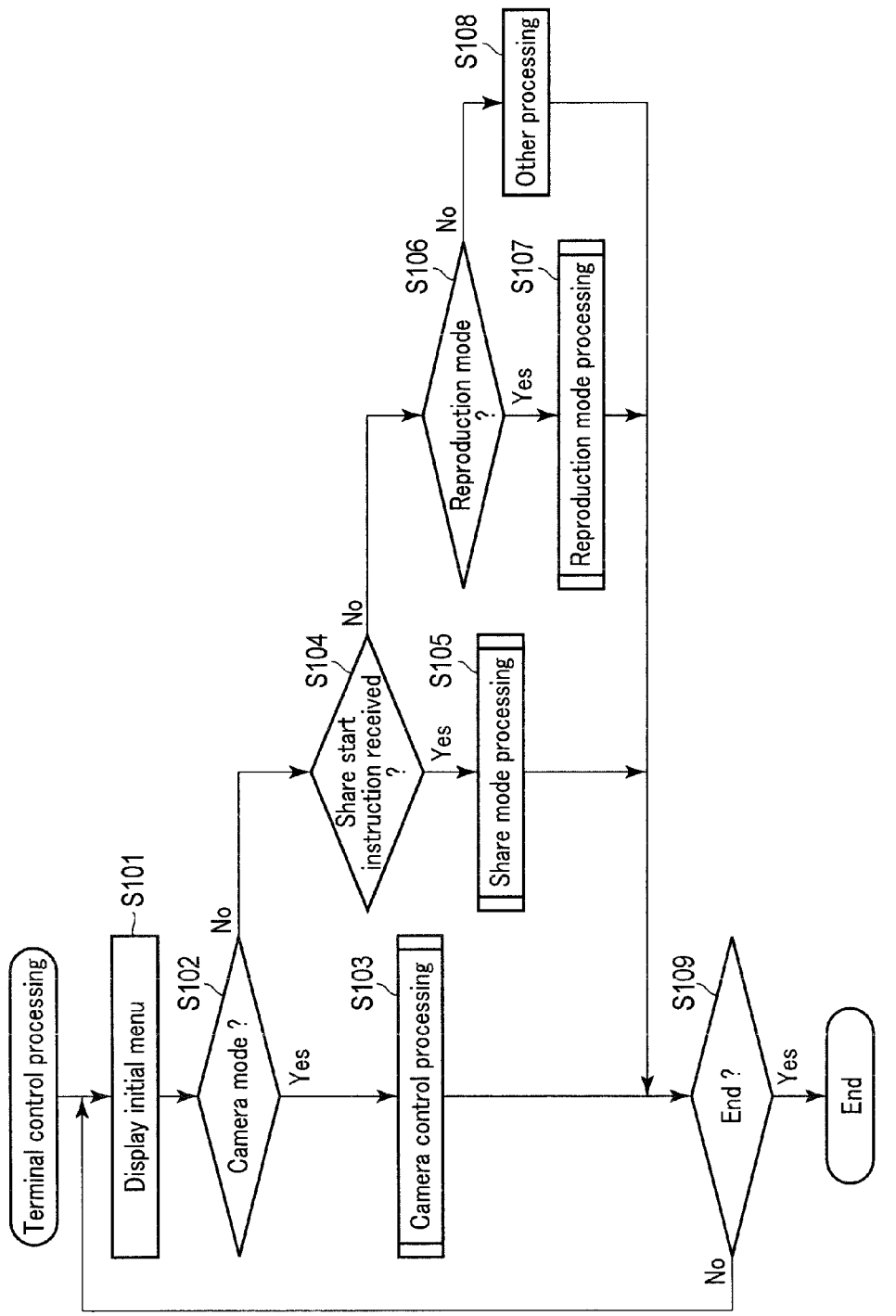
FIG. 5 is a flowchart illustrating an example of terminal control processing according to the first embodiment.

A description will now be given of the operations of the first terminal apparatus 2, imaging apparatus 1 and second terminal apparatus 3 included in the imaging system 10. First, the operations of the first terminal apparatus 2 and the second terminal apparatus 3, which are portable terminals such as smartphones, will be described with reference to the flowchart shown in FIG. 5. The terminal control processing shown in FIG. 5 is processing performed when the first terminal apparatus 2 and the second terminal apparatus 3 are ON.

In step S101, the controller of a terminal apparatus displays an initial menu on a display. This initial menu includes a plurality of icons for enabling the functions of the terminal apparatus. Each of the functions is selected when the related icon is touched by the user. The functions of the terminal apparatus include a camera mode in which the terminal apparatus functions as the first terminal apparatus 2 of the present embodiment. In the camera mode, the first terminal apparatus 2 controls the imaging apparatus 1 or performs processing for sharing an acquired image with the second terminal apparatus 3. The functions of the terminal apparatus include a share mode in which the terminal apparatus functions as the second terminal apparatus 3 of the present embodiment. In the share mode, the second terminal apparatus 3 shares an image with the first terminal apparatus 2. Prior to step S101, the imaging apparatus mentioned above or wireless apparatuses such as the second terminal apparatus 3 are identified.

In step S102, the controller of the terminal apparatus determines whether or not the camera mode is selected. If it is determined that the camera mode is selected, the processing flow advances to step S103. In step S103, the controller of the terminal apparatus performs camera control processing. The camera control processing is processing in which the terminal apparatus functioning as the first terminal apparatus 2 controls the imaging apparatus. The camera control processing will be described in detail later. After the processing in step S103, the processing flow advances to step S109.

If it is determined in step S102 that the camera mode is not selected, the processing flow advances to step S104. In step S104, the controller of the terminal apparatus determines whether or not a share start instruction is received. If it is determined that the share start instruction is received, the processing flow advances to step S105. In step S105, the controller of the terminal apparatus performs share mode processing. In the share mode, the terminal apparatus functions as the second terminal apparatus 3 and shares an image with the first terminal apparatus 2. The share mode processing will be described in detail later. After the processing in step S105, the processing flow advances to step S109.

If it is determined in step S104 that the share start instruction is not received, the processing flow advances to step S106. In step S106, the controller of the terminal apparatus determines whether or not the reproduction mode is selected. If it is determined that the reproduction mode is selected, the processing flow advances to step S107. In step S107, the controller of the terminal apparatus performs reproduction mode processing.

In the reproduction mode processing, the controller of the terminal apparatus communicates with the imaging apparatus 1 and performs processing for reproducing an image stored in the imaging apparatus storage 13 of the imaging apparatus 1. To be more specific, the controller of the terminal apparatus acquires thumbnail images of the stored images from the imaging apparatus 1 and displays a list of the thumbnail images. When one of the thumbnail images is selected, the controller acquires the selected image from the imaging apparatus 1 and displays the acquired image on the display or records it in the storage of the terminal apparatus. Subsequently, the processing flow advances to step S109.

If it is determined in step S106 that the reproduction mode is not selected, the processing flow advances to step S108. In step S108, the controller of the terminal apparatus performs processing for enabling the functions other than the camera control processing and the share mode processing. The functions include various functions executable by the terminal apparatus. For example, the functions include Internet browsing, the transmission and reception of emails, telephone calls, games, etc. A description of these functions will be omitted. After the processing in step S108, the processing flow advances to step S109.

In step S109, the controller of the terminal apparatus determines whether or not an input for ending the terminal control processing (e.g., an operation for turning off the power supply) is entered. If it is determined that the terminal control processing should not be ended, the processing flow returns to step S101. If it is determined that the terminal control processing should be ended, the terminal control processing is brought to an end.

The camera control processing performed in step S103 will be described, referring to the flowchart shown in FIG. 6. The camera control processing is processing in which the terminal apparatus functions as the first terminal apparatus 2.

In step S201, the first terminal controller 21 transmits a communication request to the imaging apparatus 1. The imaging apparatus 1 responds to this communication request, and the communications between the first terminal apparatus 2 and the imaging apparatus 1 are established. The communications between the first terminal apparatus 2 and the imaging apparatus 1 are performed, for example, in the infrastructure mode of the Wi-Fi, with the imaging apparatus 1 being used as an access point.

In step S202, the first terminal controller 21 transmits a request for a live view image to the imaging apparatus 1. On receiving this request, the imaging apparatus 1 performs an image capturing operation to generate live view image data and starts transmitting the generated live view image data to the first terminal apparatus 2. The live view image data is compressed and has a reduced image size.

In step S203, the first terminal controller 21 receives the image data for a live view image from the imaging apparatus 1 and displays the live view image on the first terminal display 24, based on the image data.

In step S204, the first terminal controller 21 determines whether or not the image capturing icon 24a is touched, namely whether or not the image capturing is instructed. If it is determined that the image capturing icon 24a is not touched, the processing flow advances to step S213. If it is determined that the image capturing icon 24a is touched, the processing flow advances to step S205.

In step S205, the first terminal controller 21 transmits an image capturing instruction to the imaging apparatus 1. The imaging apparatus 1 performs an image capturing operation in accordance with the image capturing instruction. The imaging apparatus 1 records the resultant image in the imaging apparatus storage 13. In order to transmit the image data obtained by the image capturing operation to the first terminal apparatus 2, the imaging apparatus 1 compresses the image data to a size suitable for transmission and transmits the compressed image data (reduced image data) to the first terminal apparatus 2. The image capturing instruction transmitted from the first terminal apparatus 2 to the imaging apparatus 1 includes information on the image size required by the first terminal apparatus 2. The image size may be based, for example, on the screen size of the first terminal display 24. Since the image size is properly changed, the communication load imposed on the first terminal apparatus 2 and the imaging apparatus 1 is reduced, accordingly.

In step S206, the first terminal controller 21 receives the reduced image data from the imaging apparatus 1. The first terminal controller 21 displays a reduced image on the first terminal display 24, based on the received reduced image data. In other words, the captured image is displayed on the first terminal display 24 as a rec view image. By looking at the rec view image, the user can confirm the image acquired by the image capturing operation.

In step S207, the first terminal controller 21 controls the first terminal display 24 to display the share start icon 24b. The share start icon 24b is an icon that is touched when the image obtained by the image capturing operation is to be shared with another terminal apparatus.

In step S208, the first terminal controller 21 determines whether or not a predetermined time has elapsed after the first terminal display 24 displays the reduced image in step S206. If it is determined that the predetermined time has elapsed, the processing flow advances to step S213. If it is determined that the predetermined time has not elapsed, the processing flow advances to step S209.

In step S209, the first terminal controller 21 determines whether or not the share start icon 24b is touched. If it is determined that the share start icon 24b is not touched, the processing flow returns to step S208. In other words, the processing in steps S208 and S209 is repeated until the share start icon 24b is touched or until the predetermined time elapses. If it is determined that the share start icon 24b is touched, the processing flow advances to step S210.

In step S210, the first terminal controller 21 transmits a communication request to the second terminal apparatus 3. When there is a response to the communication request, the communications between the first terminal apparatus 2 and the second terminal apparatus 3 are started. The communications between the first terminal apparatus 2 and the second terminal apparatus 3 are performed, for example, in the ad-hoc mode of the Wi-Fi.

In step S211, the first terminal controller 21 determines whether or not the communications with the second terminal apparatus 3 are established. If it is determined that the communications with the second terminal apparatus 3 have not yet been established, the processing in step S211 is repeated, and the first terminal controller 21 is on standby until the communications are established. If it is determined that the communications with the second terminal apparatus 3 have been established, the processing flow advances to step S212.

In step S212, the first terminal controller 21 transmits a share start instruction to the second terminal apparatus 3. The share start instruction includes information for identifying the imaging apparatus 1, information for identifying the image to be shared, and information required for establishing the communications between the imaging apparatus 1 and the second terminal apparatus 3. Subsequently, the processing flow advances to step S213.

In step S213, the first terminal controller 21 determines whether or not the camera mode should be ended. If it is determined that the camera mode should not be ended, the processing flow returns to step S202. When it is determined that the camera mode should be ended, the camera mode is brought to an end, and the processing flow returns to the terminal control processing described with reference to FIG. 5.

Figure 7:
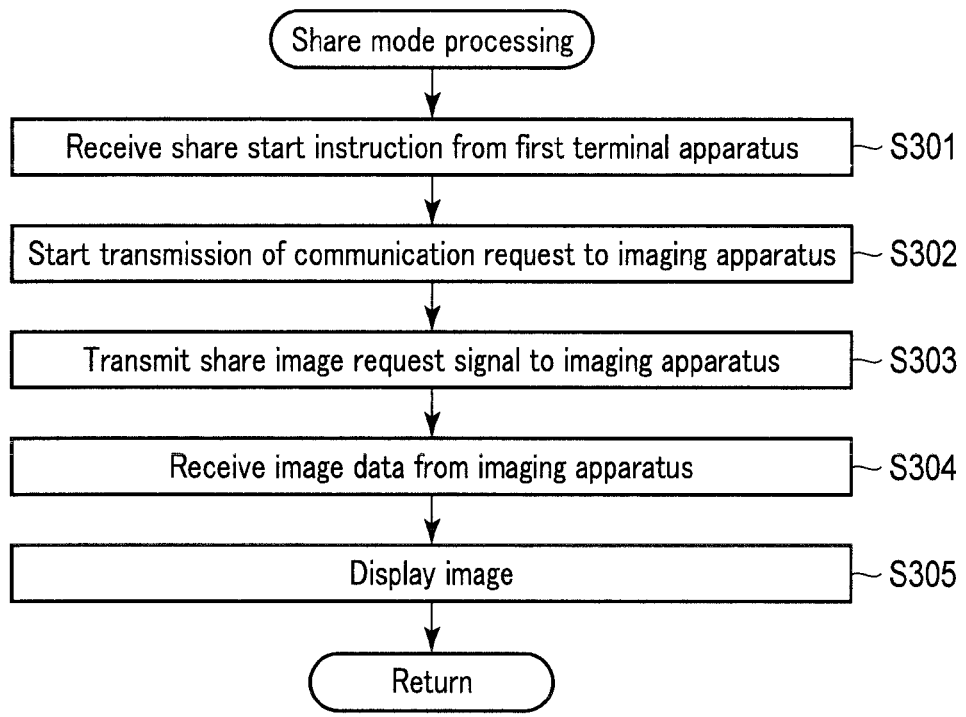
FIG. 7 is a flowchart illustrating an example of share mode processing according to the first embodiment.

The share mode processing performed in step S105 of the terminal control processing will be described, referring to the flowchart shown in FIG. 7. The share mode processing is processing in which the terminal apparatus functions as the second terminal apparatus 3.

In step S301, the second terminal controller 31 receives a share start instruction from the first terminal apparatus 2. This instruction includes information for identifying the imaging apparatus 1, information for identifying the image to be shared, and connection information required for establishing the communications between the imaging apparatus 1 and the second terminal apparatus 3.

In step S302, the second terminal controller 31 establishes communications between the imaging apparatus 1 and the second terminal apparatus 3. Based on the information which is included in the share start instruction to identify the imaging apparatus 1, the second terminal controller 31 starts transmitting a communication request to the imaging apparatus 1. The imaging apparatus 1 responds to this communication request, and the communications between the second terminal apparatus 3 and the imaging apparatus 1 are started. The communications between the imaging apparatus 1 and the second terminal apparatus 3 are performed, for example, in the infrastructure mode of the Wi-Fi, with the imaging apparatus 1 being used as an access point.

In step S303, the second terminal controller 31 transmits an image request signal to the imaging apparatus 1, based on the information which is included in the share start instruction to identify the image to be shared. The image request signal includes information for identifying the image designated by the first terminal apparatus 2 and information representing the image size of the image to be received. Based on the image data stored in the imaging apparatus storage 13, the imaging apparatus 1 receiving the image request signal generates image data corresponding to the desired size and transmits the generated image data to the second terminal apparatus 3.

In step S304, the second terminal controller 31 receives the image data from the imaging apparatus 1. In step S305, the second terminal controller 31 controls the second terminal display 34 to display an image based on the image data received in step S304. The received image data may be stored in the second terminal storage 36. Thereafter, the share mode processing is brought to an end, and the processing flow returns to the terminal control processing described with reference to FIG. 5.

Figure 8:
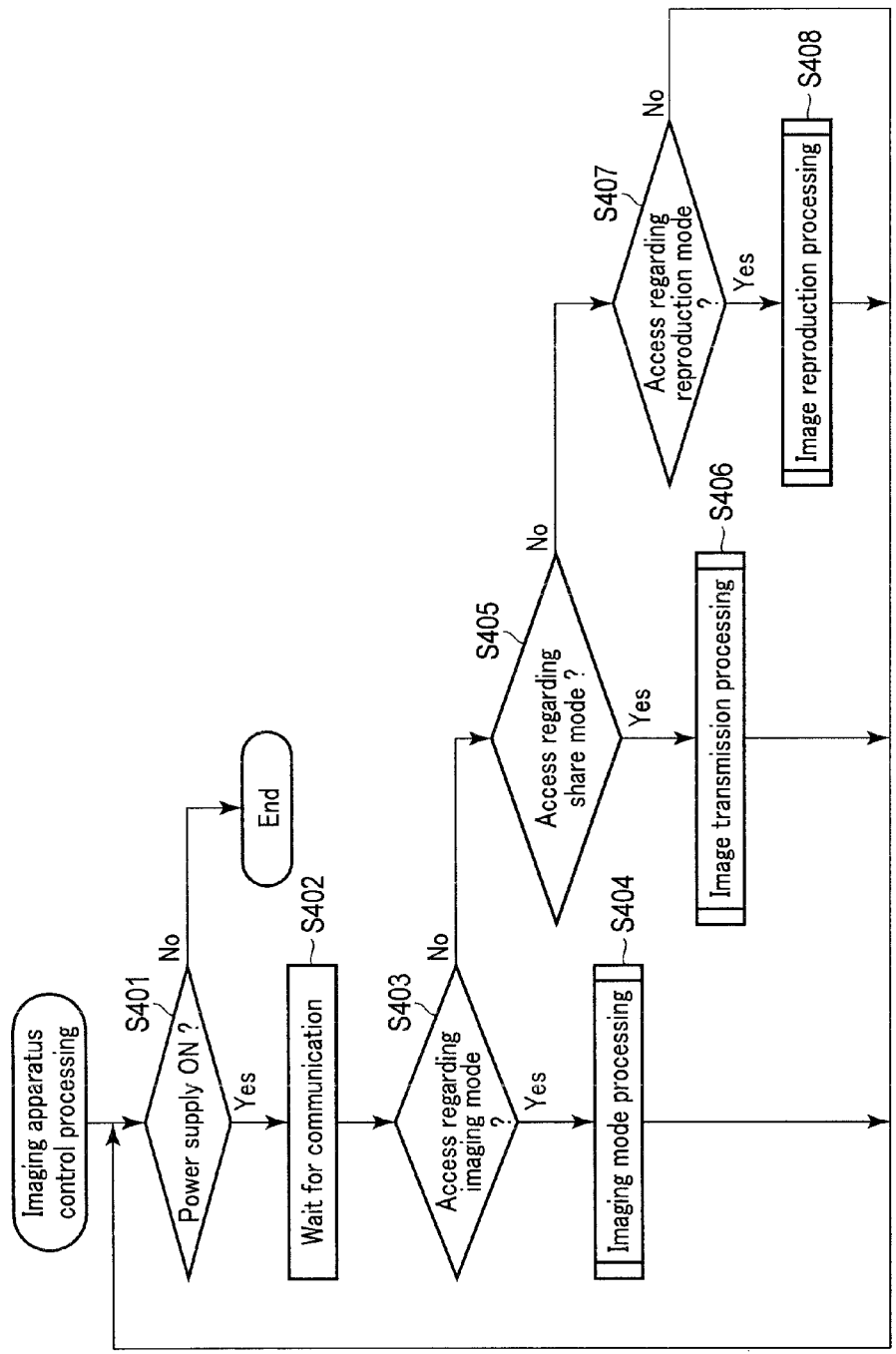
FIG. 8 is a flowchart illustrating an example of imaging apparatus control processing according to the first embodiment.

Next, the operation of the imaging apparatus 1 will be described with reference to the flowchart shown in FIG. 8. The imaging apparatus control processing shown in FIG. 8 is started, for example, when the imaging apparatus 1 is turned on.

In step S401, the imaging apparatus controller 11 determines whether or not the power supply of the imaging apparatus 1 is ON. If it is determined that the power supply is not ON, the imaging apparatus control processing is brought to an end. If it is determined that the power supply is ON, the processing flow advances to step S402. In step S402, the imaging apparatus 1 functions as an access point, as mentioned above, and the Wi-Fi communications are performed in the infrastructure mode. In step S402, the imaging apparatus controller 11 waits for a terminal apparatus to make a communication request.

In step S403, the imaging apparatus controller 11 determines whether or not the terminal apparatus makes access regarding the imaging mode. The access regarding the imaging mode is intended to refer to a communication request by which the first terminal apparatus 2 causes the imaging apparatus 1 to capture an image in the camera control processing. If it is determined that there is access regarding the imaging mode, the processing flow advances to step S404.

In step S404, the imaging apparatus controller 11 performs imaging mode processing. The imaging mode processing is processing in which the imaging apparatus 1 captures an image, transmits a live view image to the first terminal apparatus 2, acquires and records a still image, and transmits a rec view image to the first terminal apparatus 2.

The imaging mode processing will be described in detail later. After the imaging mode processing, the processing flow returns to step S401.

If it is determined in step S403 that there is no access regarding the imaging mode, the processing flow advances to step S405. In step S405, the imaging apparatus controller 11 determines whether or not there is access regarding the share mode. The access regarding the share mode is intended to refer to a communication request by which the second terminal apparatus 3 causes the imaging apparatus 1 to transmit an image in the share mode processing. If it is determined that there is access regarding the share mode, the processing flow advances to step S406.

In step S406, the imaging apparatus controller 11 performs image transmission processing. The image transmission processing is processing in which a requested image is transmitted to the second terminal apparatus 3 in accordance with the request made by the second terminal apparatus 3. The image transmission processing will be described in detail later. After the image transmission processing, the processing flow returns to step S401. Although an image was described as being transmitted in accordance with the request made by the second terminal apparatus 3, the image may be transmitted to the second terminal apparatus 3 in push type without the request when it can be assumed that such a request never fails to be made.

If it is determined in step S405 that there is no access regarding the share mode, the processing flow advances to step S407. In step S407, the imaging apparatus controller 11 determines whether or not there is access regarding the reproduction mode. The access regarding the reproduction mode is intended to refer to a communication request by which the terminal apparatus causes the imaging apparatus 1 to transmit an image in the reproduction mode processing. If it is determined that there is no access regarding the reproduction mode, the processing flow returns to step S401. If it is determined that there is access regarding the reproduction mode, the processing flow advances to step S408.

In step S408, the imaging apparatus controller 11 performs image reproduction processing. In the image reproduction processing, an image stored in the imaging apparatus storage 13 is transmitted to a terminal apparatus in accordance with a request made by the terminal apparatus. A description of the image reproduction processing is omitted. After the image reproduction processing, the processing flow returns to step S401.

Figure 9:
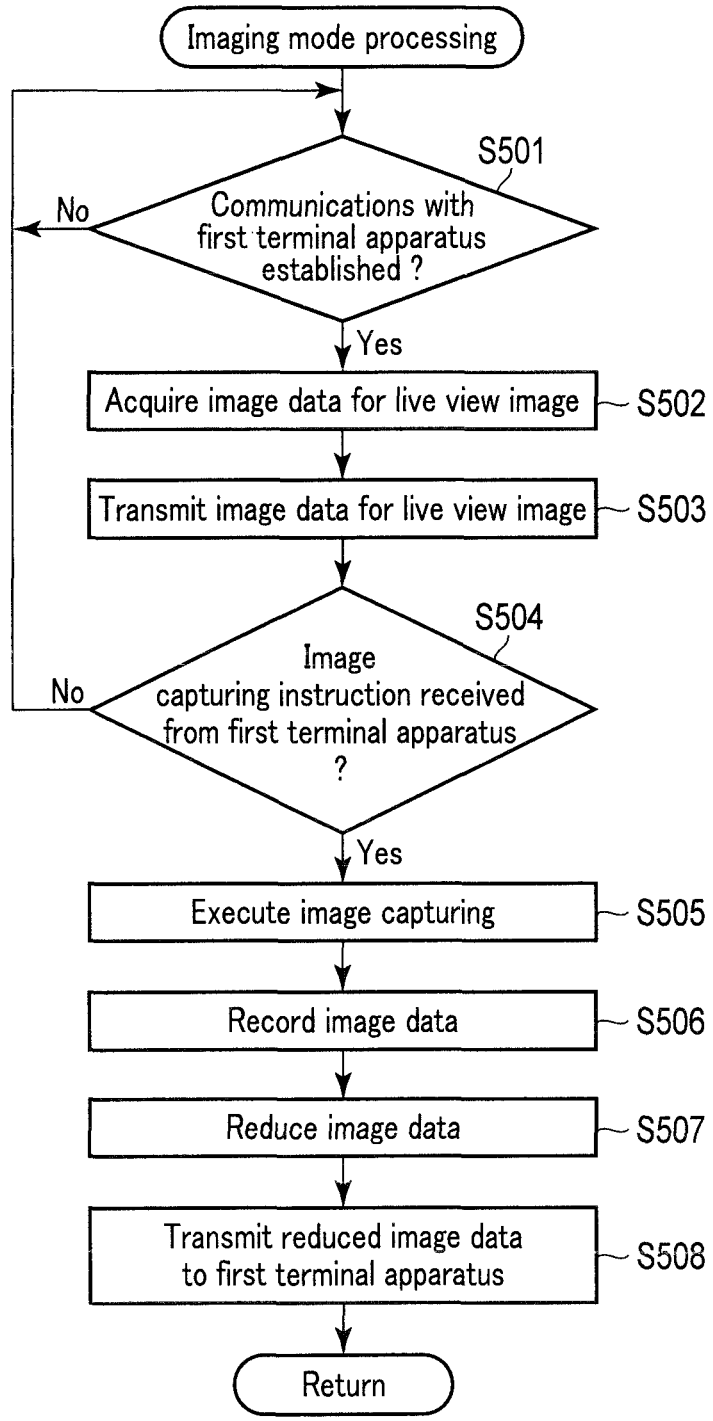
FIG. 9 is a flowchart illustrating an example of imaging mode processing according to the first embodiment.

The imaging mode processing performed in step S404 will be described, referring to the flowchart shown in FIG. 9. The imaging mode processing is executed when the first terminal apparatus 2 starts controlling the imaging apparatus 1 by the camera control processing.

In step S501, the imaging apparatus controller 11 determines whether or not the communications with the first terminal apparatus 2 are established. In step S201 of the camera control processing, the first terminal apparatus 2 requests communications with the imaging apparatus, and in step S202, it transmits an imaging mode designation. In accordance with the request, the imaging apparatus 1 starts communications with the first terminal apparatus 2. If it is determined that the communications with the first terminal apparatus 2 have not yet been established, the processing flow returns to step S501, in which the establishment of the communications with the first terminal apparatus 2 is tried again. If it is determined that the communications with the first terminal apparatus 2 have been established, the processing flow advances to step S502.

After the establishment of the communications between the imaging apparatus 1 and the first terminal apparatus 2, step 502 is executed based on the imaging mode instruction. That is, in step S502, the imaging apparatus controller 11 starts image capturing, by which image data for a live view image is acquired. To be more specific, in the imaging unit 12, incident light from the optical system forms an object image on the imaging surface of the imaging element. The imaging unit 12 generates image data based on the object image, and the imaging apparatus controller 11 acquires the image data. The imaging apparatus controller 11 performs image processing for the image data acquired from the imaging element, thereby producing image data for a live view image. The image processing includes reduction of an image. In this manner, the imaging apparatus controller 11 generates image data for a live view image by performing image processing.

In step S503, the imaging apparatus controller 11 transmits the image data for a live view image to the first terminal apparatus 2. Upon reception of the live view image data, the first terminal apparatus 2 displays the live view image in step S206.

In step S504, the imaging apparatus controller 11 determines whether or not an image capturing instruction is received from the first terminal apparatus 2. This image capturing instruction is the same as the instruction which the first terminal apparatus transmits in step S205. If it is determined that the image capturing instruction is not received from the first terminal apparatus 2, the processing flow returns to step S501. If it is determined that the image capturing instruction is received from the first terminal apparatus 2, the processing flow advances to step S505.

In step S505, the imaging apparatus controller 11 controls the imaging unit 12 to execute an image capturing operation. In step S506, the imaging apparatus controller 11 records the image data obtained by the image capturing operation in the imaging apparatus storage 13.

In step S507, the imaging apparatus controller 11 reduces the image size of the image data obtained by the image capturing operation. In step S508, the imaging apparatus controller 11 transmits the reduced image data obtained in step S507 to the first terminal apparatus 2. Thereafter, the imaging mode processing is brought to an end, and the processing flow returns to the imaging apparatus control processing described with reference to FIG. 8.

Figure 10:
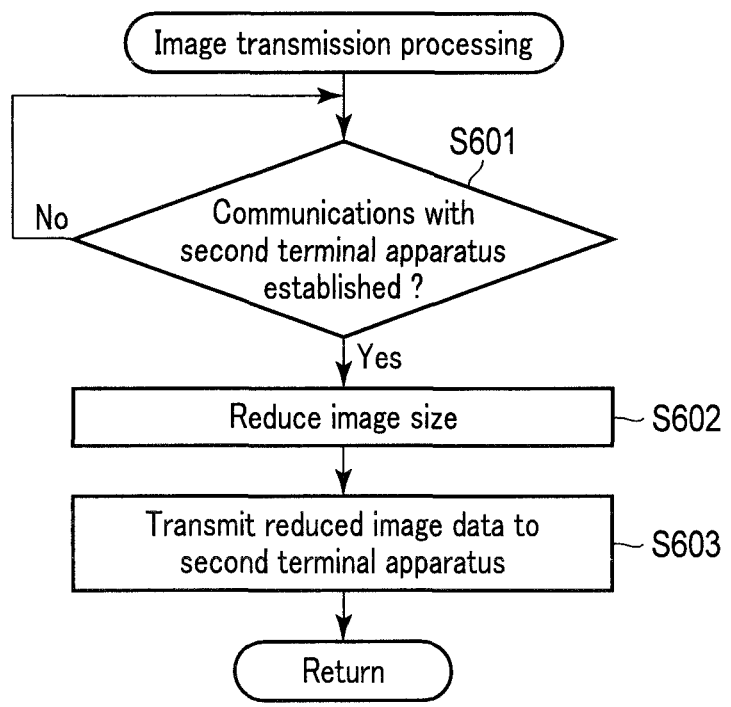
FIG. 10 is a flowchart illustrating an example of image transmission processing according to the first embodiment.

The image transmission processing performed in step S406 will be described, referring to the flowchart shown in FIG. 10. The image transmission processing is executed when the second terminal apparatus 3 starts transmitting an image request to the imaging apparatus 1 by the share mode processing.

In step S601, the imaging apparatus controller 11 determines whether or not the communications with the second terminal apparatus 3 are established. In step S302 of the share mode processing, the second terminal apparatus 3 requests communications with the imaging apparatus, and in step S303, it transmits a share image request instruction. In accordance with the request, the imaging apparatus 1 starts communications with the second terminal apparatus 3. If it is determined that the communications with the second terminal apparatus 3 have not yet been established, the processing flow returns to step S601, in which the establishment of the communications with the second terminal apparatus 3 is tried again. If it is determined that the communications with the second terminal apparatus 3 have been established, the processing flow advances to step S602.

After the establishment of the communications between the imaging apparatus 1 and the second terminal apparatus 3, the imaging apparatus 1 performs step S602 based on the share image request instruction. The share image request instruction includes information for identifying the image requested by the second terminal apparatus 3 and information on the image size requested by the second terminal apparatus 3.

In step S602, the imaging apparatus controller 11 reduces the requested image to have the requested size. In step S603, the imaging apparatus controller 11 transmits the reduced image data obtained in step S602 to the second terminal apparatus 3. In this way, the second terminal apparatus 3 acquires an image to be shared with the first terminal apparatus 2. Thereafter, the imaging mode processing is brought to an end, and the processing flow returns to the imaging apparatus control processing described with reference to FIG. 8.

As described above, the imaging system 10 of the present embodiment enables reduction of the communication load imposed on the entire system. To be more specific, although the first terminal apparatus 2 controls the image capturing operation performed by the imaging apparatus 1, the live view image data and rec view image data required for this control are compressed to have appropriate sizes, and the compressed data are transmitted from the imaging apparatus 1 to the first terminal apparatus 2. Although the images obtained by image capturing are shared by the first terminal apparatus 2 and the second terminal apparatus 3, they are transmitted from the imaging apparatus 1 to the second terminal apparatus 3. In other words, the images are transmitted from the imaging apparatus 1 (where they are stored) to the second terminal apparatus 3, without being transmitted to the first terminal apparatus 2. What is transmitted between the first terminal apparatus 2 and the second terminal apparatus 3 is not the image data but information required for identifying the images. It should be noted that the information for identifying the images has sizes far smaller than the size of the image data. Furthermore, when the images are transmitted from the imaging apparatus 1 to the second terminal apparatus 3, they are adjusted to have sizes required by the second terminal apparatus 3. The technology of the present embodiment is particularly advantageous when the communications between apparatuses are wireless communications, which are restricted in communication speed. The technology of the present embodiment enables mitigation of the users' stress.

The images acquired by the second terminal apparatus 3 do not have to be exactly the same as the images acquired by the first terminal apparatus 2. For example, the images acquired by the second terminal apparatus 3 may be images obtained by partially trimming the images acquired under the control of the first terminal apparatus 2. In this case, the first terminal apparatus 2 receives a trimming instruction from the user when the rec view is being displayed immediately after an image is captured. The received trimming instruction is included in the share start instruction transmitted from the first terminal apparatus 2 to the second terminal apparatus 3. The second terminal apparatus 3 receives the trimming information from the first terminal apparatus 2 and transmits it to the imaging apparatus 1. Based on the trimming information, the imaging apparatus 1 trims an image to be shared and transmits the trimmed image to the second terminal apparatus 3.

Not only the trimming instruction but also editing information pertaining to image processing may be transmitted from the first terminal apparatus 2 to the second terminal apparatus 3, and the image edited or processed based on the editing information may be transmitted from the imaging apparatus 1 to the second terminal apparatus 3, the editing information including a type or parameter of the image processing such as color tones etc. As can be seen from this, the images transmitted from the imaging apparatus 1 to the second terminal apparatus 3 may be images obtained by performing various kinds of image processing to captured images.

In connection with the present embodiment, reference was made to the case where captured images are shared by the first terminal apparatus 2 and the second terminal apparatus 3 immediately after they are captured by the imaging apparatus 1. However, the present invention is not limited to this. For example, images that are selected in the reproduction modes of the imaging apparatus 1 and the first terminal apparatus 2 may be shared with the second terminal apparatus 3. For example, the first terminal apparatus 2 requests that the imaging apparatus 1 provide thumbnail images of the images stored in the imaging apparatus storage 13, and the thumbnail images are displayed on the first terminal display 24 as a list. Images that are selected in the list are shared with the second terminal apparatus 3. In this case, the data on the selected images are transmitted from the imaging apparatus 1 to the second terminal apparatus 3. Since the images of required sizes are transmitted from the imaging apparatus 1 to the second terminal apparatus 3 in this case as well, the communication load imposed particularly on the first terminal apparatus 2 can be reduced.

In connection with the embodiment mentioned above, reference was made to the case where the second terminal apparatus 3 was similar to the first terminal apparatus 2 in both configuration and function. However, the present invention is not limited to this. For example, the second terminal apparatus may be a printer or the like. Let us assume that the first terminal apparatus 2 wishes to have an image captured by the imaging apparatus 1 and have it printed by the printer. In this case, the first terminal apparatus 2 outputs an instruction to cause the printer to acquire an image from the imaging apparatus 1 and print the acquired image. On receiving the instruction, the printer acquires image data designated by the imaging apparatus 1 and prints the image, based on the image obtained from the first terminal apparatus 2. In order to print a high-density image by the printer, the image data transmitted from the imaging apparatus 1 to the printer has to contain a large amount of information. Even where the system comprises a printer, the present embodiment helps reduce the communication load imposed on the entire system. The second terminal apparatus 3 may be a high-density display, such as a 4K or 8K display. The second terminal apparatus 3 is not limited to a terminal of each type but may be a system comprising a plurality of apparatuses. In this case as well, similar operations are attained by the configurations described above.

In connection with the above embodiment, reference was made to the case where the imaging apparatus was a lens-type camera. The imaging apparatus is not limited to this and may be a general digital camera. For example, the technology of the present embodiment is applicable to the case where the first terminal apparatus is a tablet terminal and designates how an image stored in a digital camera should be edited and where the second terminal apparatus is a printer and receives and prints the image data edited in accordance with the designation by the tablet terminal.

As can be seen from this, the first terminal apparatus and the second terminal apparatus may be any types of apparatus. In other words, the first terminal apparatus and the second terminal apparatus are apparatuses that are external to the imaging apparatus, and may be referred to as first and second external apparatuses, respectively.

In connection with the embodiment described above, reference was made mainly to Wi-Fi as wireless communications. However, the present invention is not limited to this. The multi-pairing mode of Bluetooth may be used, and NFC, Transfer Jet or the like may be used in combination with the Wi-Fi. In addition, a communication system different from these may be used. For example, ZigBee, Z-wave or the like may be used. A mobile communications system such as 3G and LTE including W-CDMA may be used. Furthermore, an optical wireless communication system including infrared communication such as IrDA may be used. These communication systems are properly used for communications with the imaging apparatus 1 or for the communications with the terminal apparatuses, in accordance with the speeds and communication distances of the respective communication methods.

Second Embodiment

Figure 11:
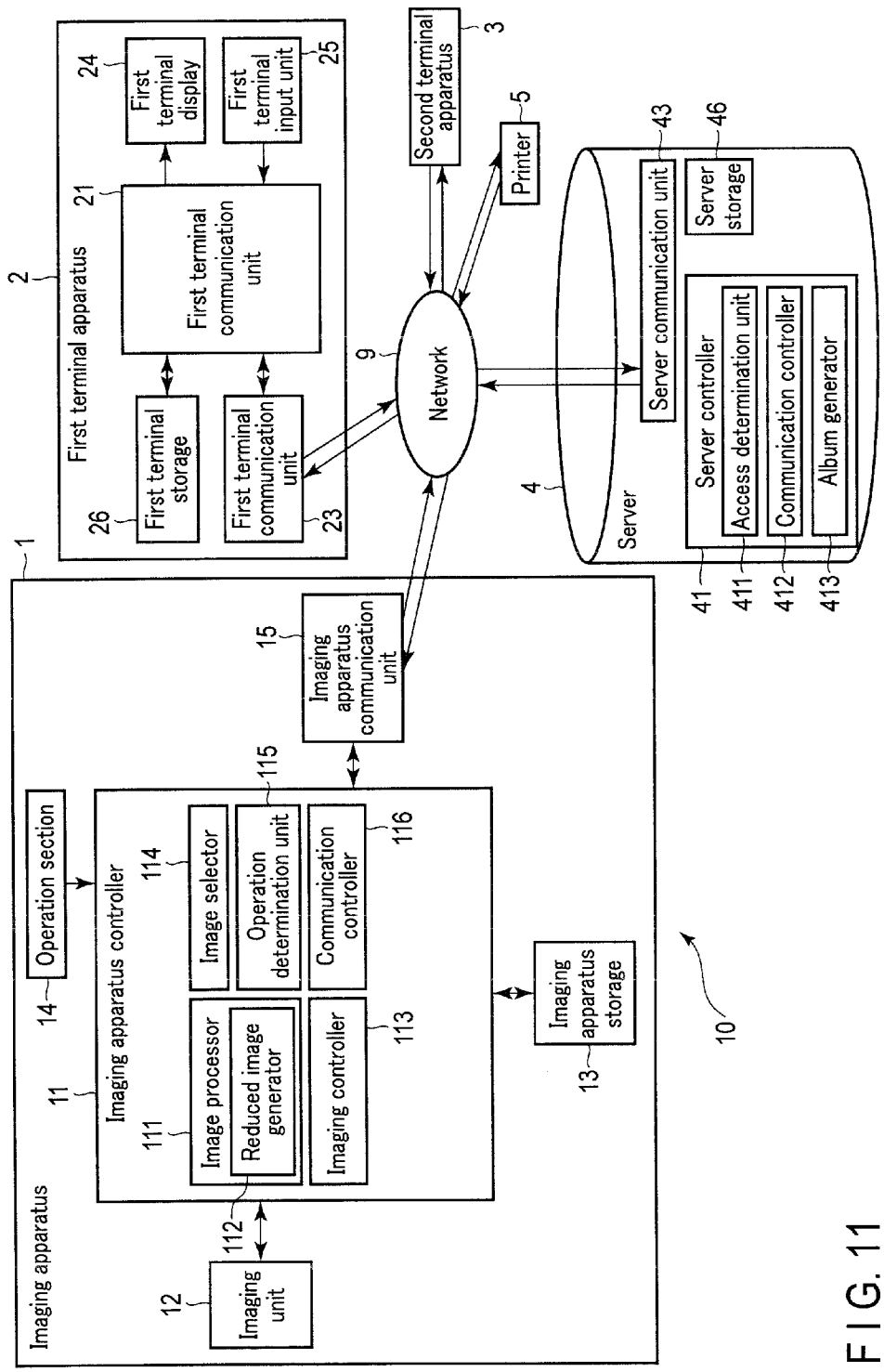
FIG. 11 is a block diagram schematically showing an exemplary configuration of an imaging system according to the second embodiment.

A description will now be given of the second embodiment. In the description below, reference will be made to how the second embodiment differs from the first embodiment. Therefore, the same symbols will be used to denote structural elements similar or corresponding to those of the first embodiment, and a description of such structural elements will be omitted. FIG. 11 schematically illustrates an exemplary configuration of the present embodiment. In the present embodiment, images to be shared are recorded in a server 4 by way of a network 9. An image recorded in the server 4 is transmitted to a second terminal apparatus 3, a printer 5 or another apparatus in accordance with a request made by the apparatus.

The server 4 includes a server controller 41, a server communication unit 43 and a server storage 46. The server communication unit 43 communicates with various types of apparatus via the network 9. The server storage 46 stores data or the like acquired from the network 9. The data stored in the server storage 46 is transmitted to each terminal by way of the network 9 in accordance with a request made. The server controller 41 controls the operation of each portion of the server 4. The server controller 41 includes an access determination unit 411, a communication controller 412 and an album generator 413. The access determination unit 411 determines which terminal accesses the server 4. The communication controller 412 controls the communications performed by way of the server communication unit 43. The album generator 413 controls the operation of generating an album on the server 4. In accordance with the instructions of the terminals accessing the server 4, the album generator 413 generates an album by associating the images stored in the server 4.

Figure 12:
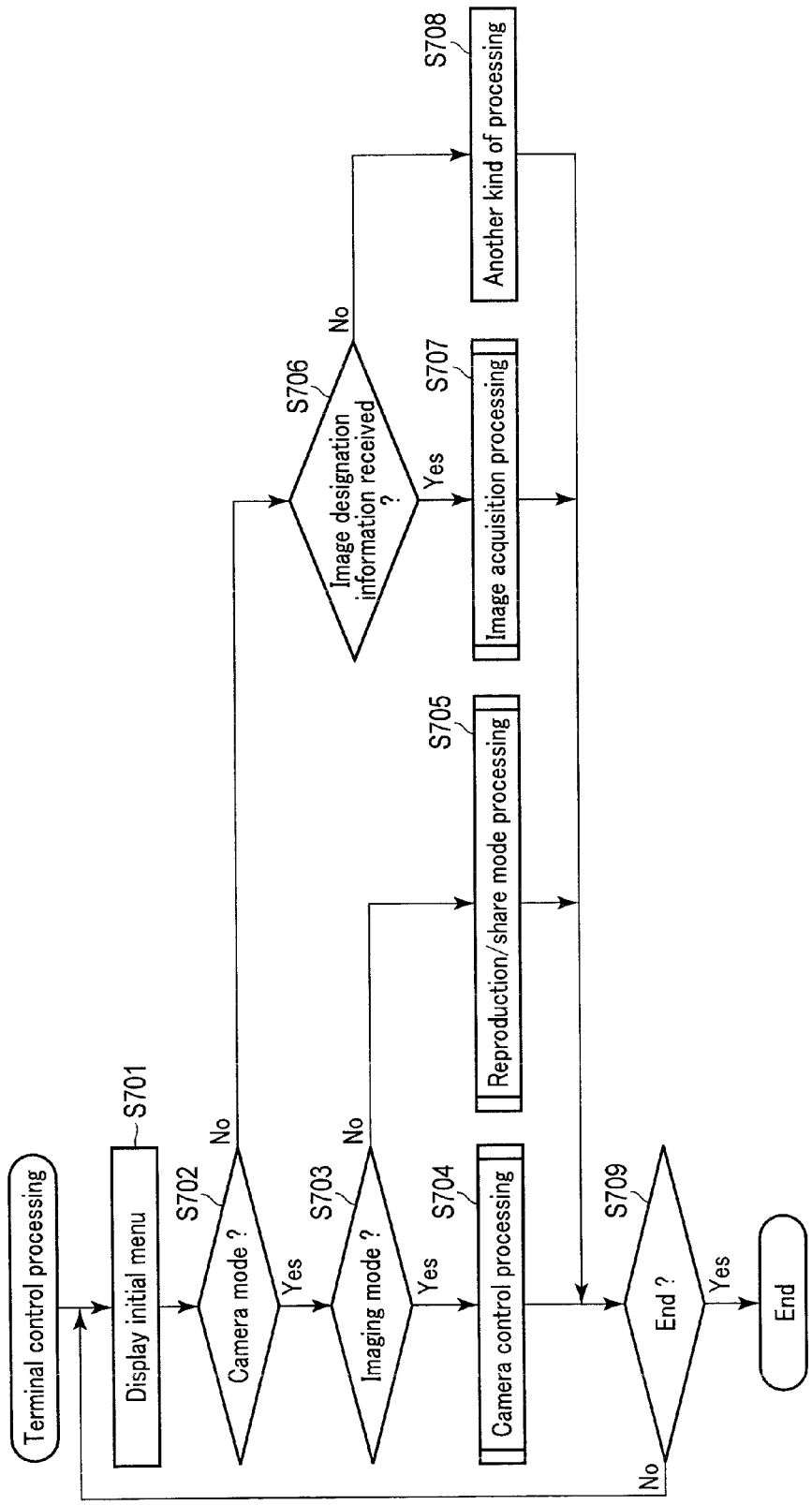
FIG. 12 is a flowchart illustrating an example of terminal control processing according to the second embodiment.

The terminal control processing performed by the first terminal apparatus 2 and second terminal apparatus 3 of the present embodiment will be explained with reference to the flowchart shown in FIG. 12. Examples of menus or images displayed on the terminal display will also be described with reference to FIGS. 13A to 13E.

Figure 13A:
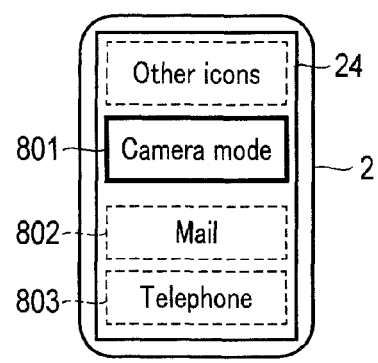
FIG. 13A schematically illustrates an example of an image displayed on a terminal display.

In step S701, the terminal controller displays an initial menu on the terminal display. For example, a menu such as that shown in FIG. 13A is displayed on the terminal display. As shown, various icons are displayed. The icons include a camera mode icon 801 for starting communications with the imaging apparatus 1 and controlling the operation of the imaging apparatus 1, a mail icon 802 for selecting the mail function, a telephone icon 803 for selecting the telephone call function, etc.

Figure 13B:
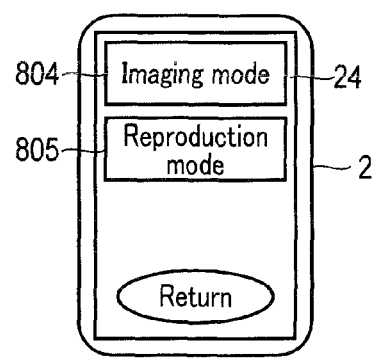
FIG. 13B schematically illustrates an example of an image displayed on the terminal display.

In step S702, the terminal controller determines whether or not the camera mode is selected. If it is determined that the camera mode is selected, the processing flow advances to step S703. The terminal apparatus functions as the first terminal apparatus 2 then. When the camera mode is selected, a menu such as that shown in FIG. 13B is displayed on the first terminal display 24. The menu includes an imaging mode icon 804 for causing the imaging apparatus to capture an image and a reproduction mode icon 805 for causing the imaging apparatus 1 to perform a reproduction operation.

In step S703, the first terminal controller 21 determines whether or not the imaging mode icon 804 is touched, namely whether or not the imaging mode is selected. If it is determined that the imaging mode is selected, the processing flow advances to step S704.

Figure 13C:
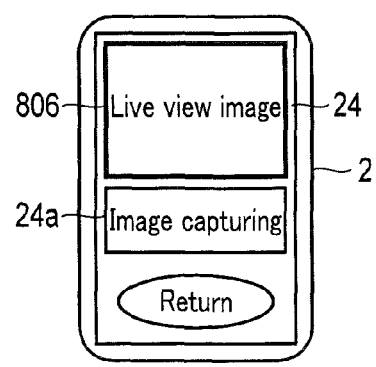
FIG. 13C schematically illustrates an example of an image displayed on the terminal display.

In step S704, the first terminal controller 21 performs camera control processing. The camera control processing is processing that is similar to the processing described with reference to FIG. 6 in connection with the first embodiment. In the camera control processing of the present embodiment, the second and third terminal apparatus do not have to perform communications with the second terminal apparatus 3 to execute the share mode, after a still image is captured. In the camera control processing, a menu such as that shown in FIG. 13C is displayed on the first terminal display 24. As shown, a live view image 806 is displayed on the first terminal display 24, and an image capturing icon 24a for starting the image capturing operation is displayed. After the camera control processing, the processing flow advances to step S709.

Figure 14:
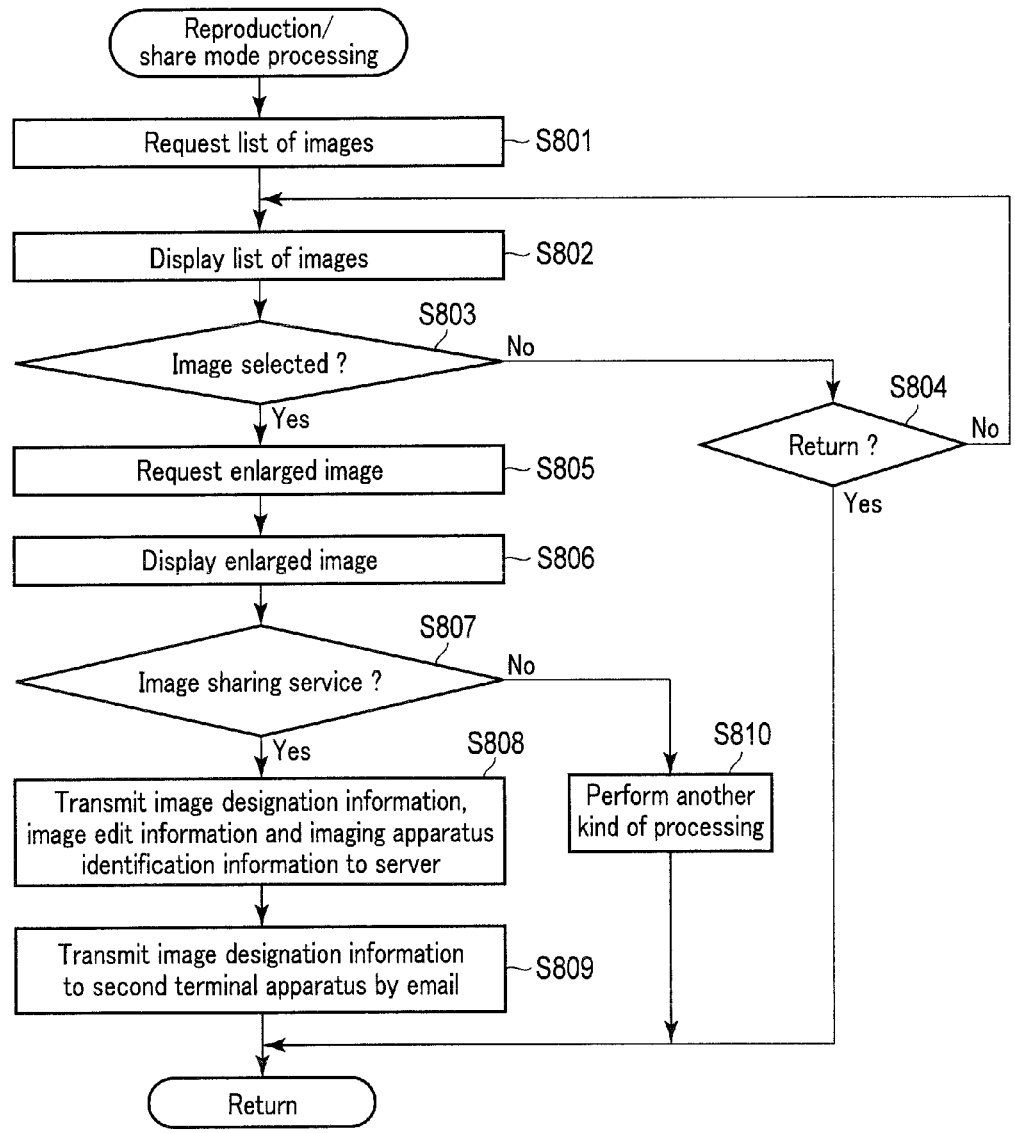
FIG. 14 is a flowchart illustrating an example of reproduction/share mode processing according to the second embodiment.

If it is determined in step S703 that the image capturing mode is not selected, the processing flow advances to step S705. In step S705, the first terminal controller of 21 performs reproduction/share mode processing. The reproduction/share mode processing will be described with reference to the flowchart shown in FIG. 14.

In step S801, the first terminal controller 21 requests the imaging apparatus 1 to provide a list of images. In response to the request, the imaging apparatus 1 transmits thumbnail images of the images stored in the imaging apparatus storage 13 to the first terminal apparatus 2.

Figure 13D:
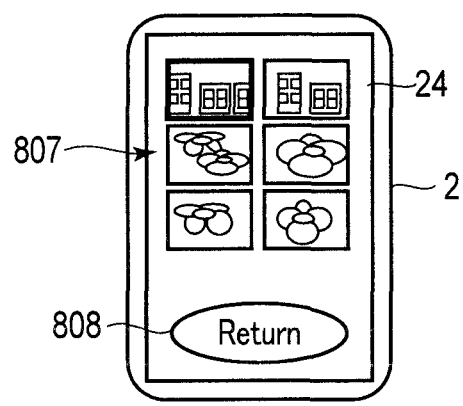
FIG. 13D schematically illustrates an example of an image displayed on the terminal display.

In step S802, the first terminal controller 21 controls the first terminal display 24 to display the received thumbnail images. Images such as those shown in FIG. 13D are displayed on the first terminal display 24. In other words, a list of thumbnail images 807 is displayed on the first terminal display 24.

In step S803, the first terminal controller 21 determines whether or not an image is selected. If it is determined that no image is selected, the processing flow advances to step S804. In step S804, the first terminal controller 21 determines whether or not a return icon 808 is touched. If it is determined that the return icon 808 is not touched, the processing flow returns to step S802. If it is determined that the return icon 808 is touched, the reproduction/share mode processing is brought to an end, and the processing flow returns to the terminal control processing described with reference to FIG. 12.

If it is determined in step S803 that an image is selected, the processing flow advances to step S805. In step S805, the first terminal controller 21 requests an enlarged image of the selected image from the imaging apparatus 1. In response to this request, the imaging apparatus 1 transmits the enlarged image of the selected image to the first terminal apparatus 2.

Figure 13E:
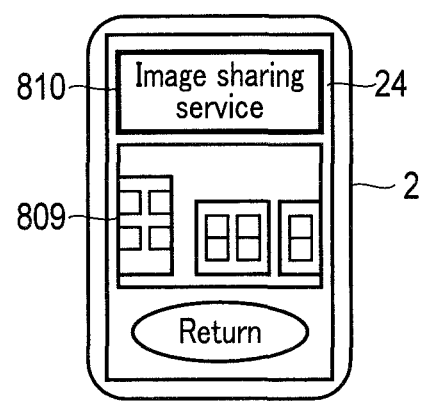
FIG. 13E schematically illustrates an example of an image displayed on the terminal display.

In step S806, the first terminal controller 21 controls the first terminal display 24 to display the enlarged image received from the imaging apparatus 1. An image such as that shown in FIG. 13E is displayed on the first terminal display 24 then. That is, the selected image 809 is displayed. Along with the image, an image sharing service icon 810 for executing the image sharing service is displayed.

In step S807, the first terminal controller 21 determines whether or not the image sharing service icon 810 is touched, namely whether or not the image sharing service is selected. If it is determined that the image sharing service is selected, the processing flow advances to step S808.

In step S808, the first terminal controller 21 transmits information related to the currently selected image to the server 4. More specifically, the first terminal controller 21 transmits image designation information for specifying the currently selected image, image edit information representing how the currently selected image should be edited, and imaging apparatus information for specifying the imaging apparatus to the server 4. Upon reception of the information, the server 4 communicates with the imaging apparatus 1 to transmit the image designation information and the image edit information to the imaging apparatus 1 and to receive the designated image edited based on the image edit information from the imaging apparatus 1.

In step S809, the first terminal controller 21 transmits the image designation information to the second terminal apparatus 3 by email. Thereafter, the reproduction/share mode processing is brought to an end, and the processing flow returns to the terminal control processing.

If it is determined in step S807 that the image sharing service is not selected, the processing flow advances to step S810. In step S810, the first terminal controller 21 performs processing other than the image sharing service. A description of such processing is omitted. After step S810, the reproduction/share mode processing is brought to an end, and the processing flow returns to the terminal control processing.

Turning back to FIG. 12, the terminal control processing will be described again. After the reproduction/share mode processing, the processing flow advances to step S709.

If it is determined in step S702 that the camera mode is not selected, the processing flow advances to step S706. In step S706, the terminal controller determines whether or not the image designation information is received by email. If it is determined that the information is received by email, the processing advances to step S707.

In step S707, the terminal controller performs image acquisition processing. At the time, the terminal apparatus functions as the second terminal apparatus 3 which acquires an image captured by the imaging apparatus 1 as an image to be shared. The image acquisition processing will be described with reference to the flowchart shown in FIG. 15.

In step S901, the second terminal controller 31 accesses the server 4 based on the image designation information received by email. In step S902, the second terminal controller 31 requests the server 4 to provide image data of the designated image based on the image designation information and acquires the image data from the server 4. Thereafter, the image acquisition processing is brought to an end.

By the image acquisition processing, the second terminal apparatus 3 can acquire an image, which is captured by the imaging apparatus 1 and the sharing of which is requested by the first terminal apparatus 2, from the server 4 on the basis of the image designation information. In this manner, an image is shared by the first terminal apparatus 2 and the second terminal apparatus 3. Thereafter, the image sharing processing is brought to an end, and the processing flow returns to the terminal control processing described with reference to FIG. 12.

Turning back to FIG. 12, the terminal control processing will be described again. If it is determined in step S706 that the image designation information is not received, the processing flow advances to step S708. In step S708, the terminal controller performs another kind of processing, which is other than those described above. A description of such processing is omitted. After the processing in step S708, the processing flow advances to step S709.

In step S709, the terminal controller determines whether or not the terminal control processing should be ended. If it is determined that the terminal control processing should not be ended, the processing flow returns to step S701. If it is determined that the terminal control processing should be ended, the terminal control processing is brought to an end.

The server control processing performed by the server 4 will be described, referring to the flowchart shown in FIG. 16.

In step S1001, the server controller 41 determines whether or not an image acquisition instruction is entered. If image designation information or the like is transmitted to the server 4 in step S808 of the reproduction/share mode processing performed by the first terminal apparatus 2, this means that an image acquisition instruction has been entered. If it is determined that the image acquisition instruction is entered, the processing flow advances to step S1002

In step S1002, the server controller 41 identifies the imaging apparatus 1 based on the imaging apparatus information acquired from the first terminal apparatus 2 and performs communications with the imaging apparatus 1. The server controller 41 transmits the image designation information and the image edit information to the imaging apparatus 1 and receives the image data edited based on the image edit information from the imaging apparatus 1. Subsequently, the processing flow returns to step S1001.

If it is determined in step S1001 that an image acquisition instruction is not entered, the processing flow advances to step S1003.

In step S1003, the server controller 41 determines whether or not an image transmission request is made. The image transmission request is made in the image acquisition processing performed by the second terminal apparatus 3 and requests image data on a predetermined image. If it is determined that the image transmission request is made, the processing flow advances to step S1004. In step S1004, the server controller 41 transmits the requested image data in accordance with the request made by the second terminal apparatus 3. Subsequently, the processing flow returns to step S1001. Although the image data was described as being transmitted in accordance with the request made by the second terminal apparatus 3, it can be assumed that such a request never fails to be made. If this is the case, the server controller 41 may transmit the image data to the second terminal apparatus 3 in push type. Although the image transmission was described as being performed in response to the request transmitted from the second terminal apparatus 3 to the server 4, there can be a case where the image transmission is made without such a request. For example, an ad may be transmitted based on a precontract or the like. Even in such a case, the total communication load can be reduced based on the technology of the present embodiment. In other words, the present embodiment is applicable to such a case as well. That is, the "request" may be made by either side, and the communications actually performed are not limited to the timing described above and may be arbitrarily determined. The "request" can be made under certain conditions, such as the time when a terminal is not used for another purpose or the time when the communications condition is stable.

If it is determined in step S1003 that the image transmission request is not made, the processing flow advances to step S1005. In step S1005, the server controller 41 performs another kind of processing. A description of such processing is omitted. After the processing in step S1005, the processing flow returns to step S1001.

The server 4 transmits a requested image not only in response to a transmission request made by the second terminal apparatus 3 but also in response to transmission requests which various apparatus may make with respect to the images stored in the server storage 46. For example, if image data is provided in response to a request made by the printer 5, image print service can be realized. Needless to say, image data may be provided in response to a request made by a PC to which the printer is connected or by a system including the printer. The request may be made by an apparatus other than the printer, such as an observation apparatus or a display.

As described above, according to the present embodiment, images acquired by the first terminal apparatus 2 and images acquired by the imaging apparatus 1 are stored in the server 4. The stored images are transmitted from the server 4 to a terminal apparatus designated by the first terminal apparatus 2, in response to a request made by that terminal apparatus. In this manner, the images acquired by the imaging apparatus 1 are shared by another apparatus. Since each terminal apparatus acquires images from the server 4, the communication load on the first terminal apparatus 2 etc. can be reduced, accordingly. Since each apparatus acquires information on an image to be shared from the first terminal apparatus 2, a terminal apparatus that is not related to the first terminal apparatus 2 is prevented from acquiring an image, and the privacy can therefore be protected.

In connection with the above-mentioned embodiment, reference was made to the case where the server 4 requests the imaging apparatus to provide an image based on the information supplied from the first terminal apparatus 2. However, the present invention is not limited to this. For example, the system may be configured such that the imaging apparatus 1 transmits a designated image to the server 4 based on an instruction supplied from the first terminal apparatus 2.

Of the techniques described in connection with the above embodiments, the controls described with reference to flowcharts are realized as programs. The programs can be stored in a recording medium or a storage. The programs can be recorded in the recording medium or recording unit in various ways. They may be recorded at the time of shipping a product, they can be recorded using a distributed recording medium, or they can be downloaded from the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
an imaging unit which generates first image data by image capturing;
a storage which stores the first image data;
a communication unit which performs data communications between the imaging apparatus and a first external apparatus and between the imaging apparatus and a second external apparatus;
and
a communication controller which controls communications via the communication unit, the communications including
(i) transmission of the first image data or image data derived from the first image data to the first external apparatus for display on the first external apparatus, and
(ii) transmission of image data related to the first image data to the second external apparatus in accordance with a request, wherein the request includes information (1) based at least one communication from the first external apparatus to the second external apparatus and (2) identifies image data stored in the storage, whereby the request permits image data stored in the storage to be shared with the second external apparatus,
wherein a speed of communications between the imaging apparatus and the first external apparatus is higher than that of communications between the first external apparatus and the second external apparatus.

2. The imaging apparatus according to claim 1, wherein the communications between the first external apparatus and the second external apparatus include communications of information for identifying the first image data, and
the request made by the second external apparatus include information for identifying the first image data.

3. The imaging apparatus according to claim 1, wherein the communications between the first external apparatus and the second external apparatus include communications of information for identifying the first image data and information for identifying the imaging apparatus, and
the request made by the second external apparatus include information for identifying the first image data.

4. The imaging apparatus according to claim 1, wherein communications between the imaging apparatus and the second external apparatus are performed in infrastructure mode of Wi-Fi, with the imaging apparatus being used as an access point.

5. The imaging apparatus according to claim 1, wherein communications between the first external apparatus and the second external apparatus are performed in ad-hoc mode of Wi-Fi.

6. The imaging apparatus according to claim 1, further comprising an image processor which generates second image data based on the first image data by reducing size of the first image data in accordance with image size required of the first external apparatus.

7. The imaging apparatus according to claim 1, wherein the communications between the first external apparatus and the second external apparatus include communications of information for identifying the first image data, and
the request includes a request the second external apparatus makes to transmit the image data related to the first image data from the imaging apparatus to the second external apparatus.

8. The imaging apparatus according to claim 1, wherein
the communications between the first external apparatus and the second external apparatus include communications of connection information for establishing communications between the imaging apparatus and the second external apparatus, and
the communications between the imaging apparatus and the second external apparatus are established using the connection information.

9. The imaging apparatus according to claim 1, wherein
the communication controller controls communications of receiving an image capturing instruction from the first external apparatus, and
the transmission of the first image data or image data derived from the first image data to the first external apparatus for display on the first external apparatus is responsive to receipt of a first request that includes a request made after the image capturing to transmit a rec view image to the first external apparatus as the second image data.

10. The imaging apparatus according to claim 1, further comprising an image processor which generates processed image data based on the first image data,
wherein the communication controller uses the communication unit and controls transmission of the processed image data to the second external apparatus in accordance with the request.

11. The imaging apparatus according to claim 10, wherein
the communications between the first external apparatus and the second external apparatus include communications of information for identifying the first image data and information for generating the further image data based on the first image data,
the request is a request made by the second external apparatus and includes information for identifying the first image data and information for generating the further image data based on the first image data, and
the image processor generates the further image data based on information for identifying the first image data and information for generating the further image data based on the first image data.

12. The imaging apparatus according to claim 11, wherein the information for generating the further image data based on the first image data includes size of the further image data, a range of trimming performed based on the first image data, or a type or parameter of image processing performed for the first image data.

13. An imaging system comprising:
a first external apparatus;
a second external apparatus; and
an imaging apparatus comprising:
an imaging unit which generates first image data by image capturing;
a storage which stores the first image data;
a communication unit which performs data communications between the imaging apparatus and the first external apparatus and between the imaging apparatus and the second external apparatus; and
a communication controller which controls communications via the communication unit, the communication including (i) transmission of the first image data or data derived from the first image data to the first external apparatus for display on the first external apparatus, and
(ii) transmission of image data related to the first image data to the second external apparatus in accordance with a request, wherein the request includes information (1) based at least one communication from the first external apparatus to the second external apparatus and (2) identifies image data stored in the storage, whereby the request permits image data stored in the storage to be shared with the second external apparatus;
wherein the first external apparatus transmits information on the image data related to the first image data to the second external apparatus;
wherein the second external apparatus receives the image data related to the first image data from the imaging apparatus; and
wherein a speed of communications between the imaging apparatus and the first external apparatus is higher than that of communications between the first external apparatus and the second external apparatus.

14. A control method for an imaging apparatus, comprising:
generating first image data by image capturing;
storing the first image data;
transmitting the first image data or data derived from the first image data to a first external apparatus for display on the first external apparatus; and
transmitting image data related to the first image data to a second external apparatus in accordance with a request received from the second external apparatus, wherein the request includes information (1) based at least one communication from the first external apparatus to the second external apparatus and (2) identifies image data stored in the storage, and permits image data stored in a storage to be shared with the second external apparatus,
wherein a speed of communications between the imaging apparatus and the first external apparatus is higher than that of communications between the first external apparatus and the second external apparatus.

15. A non-transitory computer-readable recording medium storing a control program that causes a computer to:
generate first image data by image capturing;
store the first image data;
transmit the first image data or data derived from the first image data to a first external apparatus for display on the first external apparatus; and
transmit image data related to the first image data to a second external apparatus in accordance with a request received from the second external apparatus, wherein the request includes information (1) based at least one communication from the first external apparatus to the second external apparatus and (2) identifies image data stored in the storage, and permits image data stored in a storage to be shared with the second external apparatus,
wherein a speed of communications between the imaging apparatus and the first external apparatus is higher than that of communications between the first external apparatus and the second external apparatus.

* * * * *